US012735351B2

(12) United States Patent
Sekiya

(10) Patent No.: US 12,735,351 B2
(45) Date of Patent: Sep. 15, 2026

(54) CHEMICALLY STRENGTHENED GLASS, METHOD FOR MANUFACTURING CHEMICALLY STRENGTHENED GLASS, ELECTRONIC DEVICE PRODUCT, AND GLASS FOR CHEMICAL STRENGTHENING

(71) Applicant: AGC Inc., Tokyo (JP)

(72) Inventor: Kaname Sekiya, Chiyoda-ku (JP)

(73) Assignee: AGC Inc., Tokyo (JP)

( * ) Notice: Subject to any disclaimer, the term of this patent is extended or adjusted under 35 U.S.C. 154(b) by 438 days.

(21) Appl. No.: 18/472,365

(22) Filed: Sep. 22, 2023

(65) Prior Publication Data

US 2024/0116806 A1 Apr. 11, 2024

(30) Foreign Application Priority Data

Sep. 30, 2022 (JP) ................................ 2022-158728
Jun. 14, 2023 (JP) ................................ 2023-097664

(51) Int. Cl.
*C03C 21/00* (2006.01)
*C03C 3/083* (2006.01)

(52) U.S. Cl.
CPC ............ *C03C 21/002* (2013.01); *C03C 3/083* (2013.01)

(58) Field of Classification Search
None
See application file for complete search history.

(56) References Cited

U.S. PATENT DOCUMENTS

| | | | |
|---|---|---|---|
| 9,359,251 | B2 | 6/2016 | Bookbinder et al. |
| 10,150,698 | B2 | 12/2018 | Amin et al. |
| 2020/0039876 | A1 | 2/2020 | Imakita et al. |
| 2020/0325066 | A1 | 10/2020 | Murayama et al. |
| 2022/0135466 | A1 | 5/2022 | Maeda et al. |
| 2022/0204400 | A1 | 6/2022 | Imakita et al. |
| 2023/0119617 | A1 | 4/2023 | Murayama et al. |

FOREIGN PATENT DOCUMENTS

| | | | |
|---|---|---|---|
| CA | 2 260 420 | A1 | 7/1999 |
| EP | 0 933 377 | A2 | 8/1999 |
| JP | 2000-144097 | A | 5/2000 |
| WO | WO 2018/186402 | A1 | 10/2018 |
| WO | WO 2021/010376 | A1 | 1/2021 |

*Primary Examiner* — Benjamin L Utech
(74) *Attorney, Agent, or Firm* — Oblon, McClelland, Maier & Neustadt, L.L.P.

(57) ABSTRACT

The present invention relates to a chemically strengthened glass having a K-DOL defined as below of 5 μm or less, and having a value $CS_{50}$/(K-DOL×t) obtained by dividing a compressive stress $CS_{50}$ (MPa) at a depth of 50 μm from a surface of the chemically strengthened glass by a product of the K-DOL (μm) and a sheet thickness t (mm) of 45 (MPa/(μm·mm)) or more, K-DOL being a depth value (μm) from a glass surface of a compressive stress layer caused by K ions.

10 Claims, 8 Drawing Sheets

CHEMICALLY STRENGTHENED GLASS, METHOD FOR MANUFACTURING CHEMICALLY STRENGTHENED GLASS, ELECTRONIC DEVICE PRODUCT, AND GLASS FOR CHEMICAL STRENGTHENING

CROSS-REFERENCE TO RELATED APPLICATIONS

This application is based on and claims priority under 35 USC 119 from Japanese Patent Application No. 2022-158728 filed on Sep. 30, 2022, and Japanese Patent Application No. 2023-097664 filed on Jun. 14, 2023, the entire content of which is incorporated herein by reference.

TECHNICAL FIELD

The present invention relates to a chemically strengthened glass, a method for manufacturing a chemically strengthened glass, an electronic device product, and a glass for chemical strengthening.

BACKGROUND ART

A chemically strengthened glass is used for a cover glass of a mobile terminal such as a smartphone. The chemically strengthened glass is a glass in which a compressive stress layer is formed in a glass surface portion through an ion exchange treatment, in which a glass is brought into contact with a molten salt composition such as sodium nitrate and potassium nitrate. In the ion exchange treatment, ions are exchange between alkali metal ions contained in the glass and alkali metal ions having a larger ion radius contained in the molten salt composition, so that the compressive stress layer is formed in the glass surface portion.

A strength of the chemically strengthened glass depends on a stress profile represented by a compressive stress (hereinafter may be abbreviated as "CS") with a depth from a glass surface as a variable. When the ion exchange treatment is performed in two stages or more, as the compressive stress layer, a "surface compressive stress layer" is formed mainly by introducing potassium ions and the like into the glass, and a "deep compressive stress layer" is formed mainly by introducing sodium ions and the like into the glass.

However, in a case where the compressive stress layer is formed in the glass surface portion, tensile stress (hereinafter may be abbreviated as "CT") necessarily occurs in a glass core portion according to a total amount of the compressive stress. In a case where the CT value is too large, a glass article is broken violently and fragments scatter. In a case where the CT value exceeds a threshold value (hereinafter referred to as "CT limit"), the glass breaks, resulting in an explosive increase in the number of fragments during injury. The CT limit is a specific value for a glass composition.

Therefore, in a chemically strengthened glass, while a surface compressive stress is set to be large and a compressive stress layer is formed in a deeper portion, the total amount of the compressive stress of the surface layer is designed so that the CT value does not exceed the CT limit. For example, Patent Literature 1 discloses a chemically strengthened glass in which CT is controlled so as to fall within a specific range. Patent Literature 2 discloses a chemically strengthened glass having CS and DOC in specific ranges. Patent Literature 3 discloses a chemically strengthened glass in which a total amount of compressive stress is a certain value or less.

One of indices for evaluating a strength of a glass material used in products such as smartphones is a "set drop strength test". The set drop strength test is a test method in which an electronic device product such as a smartphone or a tablet, or a structure that simulates an electronic device such as a smartphone, to which a glass is laminated, is dropped onto an evaluation surface fixed in a horizontal state, so as to evaluate a state during breaking. There are various methods for evaluating the set drop strength, and examples thereof include the following methods (1) and (2). The "set drop strength test" in the present invention intends the evaluation method of the following (2), and the "set drop strength" is represented by a "break height" in centimeters.

(1) A method of repeatedly dropping the same simulated structure from the same height and evaluating the number of drops when breaking occurs.

(2) A method of dropping the same simulated structure from a predetermined height and then increasing a drop height in a predetermined pitch width, and evaluating a height at which breaking finally occurs.

A chemically reinforced cover glass installed in an electronic device product such as a smartphone or a tablet is easily stained by fingerprints, sebum, sweat, and the like because of being touched by human fingers during use. In addition, once these stains adhere, the stains are difficult to remove, and stand out due to differences in light scattering and reflection between areas with and without stains, and therefore, there is a problem that visibility and beauty are impaired. For this reason, there is known a method of using a glass substrate including an antifouling layer made of a fluorine-containing organic compound formed on a portion touched by a human finger or the like as the cover glass (Patent Literature 4). The antifouling layer is sometimes referred to as AFP (Anti-Finger Print). The antifouling layer is required to have high water repellency and oil repellency in order to prevent the adhesion of stains, and is also required to have abrasion resistance against repeated wiping of the adhered stains.

Patent Literature 5 discloses that the lower a surface resistivity of the chemically strengthened cover glass, the higher durability of the antifouling layer. The surface resistivity is correlated with an electrical conductivity of the glass surface, and a low surface resistivity indicates a high electrical conductivity of the glass surface. That is, increasing the electrical conductivity of the glass surface improves the durability of the antifouling layer.

CITATION LIST

Patent Literature

Patent Literature 1: U.S. Pat. No. 9,359,251B2
Patent Literature 2: U.S. Pat. No. 10,150,698B2
Patent Literature 3: WO2018/186402A1
Patent Literature 4: JP2000-144097A
Patent Literature 5: WO2021/010376A1

SUMMARY OF INVENTION

In the set drop strength test, there are various types of evaluation surfaces on which the simulated structure is dropped. For example, the evaluation surfaces include surfaces with small surface roughness such as marble, and surfaces with large surface roughness such as asphalt and sandpaper. Especially, it is known that stress at a specific depth from the glass surface is effective for evaluation surfaces with large surface roughness such as asphalt and sandpaper. Specifically, the set drop strength when the evaluation surface is a sandpaper with a count of 60 to 100 has a positive correlation with the stress at a depth of 90 μm from the surface. The set drop strength when the evaluation surface is a sandpaper with a count of 100 to 140 has a positive correlation with the stress at a depth of 70 μm from the surface. The set drop strength when the evaluation surface is a sandpaper with a count of 160 to 200 has a positive correlation with the stress at a depth of 50 μm from the surface.

As shown in FIG. 1, there is a positive correlation between the set drop strength when a sandpaper with a count of 180 is used as the evaluation surface and a deep compressive stress value at a depth of 50 μm from the glass surface (hereinafter referred to as $CS_{50}$), and $CS_{50}$ is a value that greatly contributes to improvement of the set drop strength when a sandpaper with a count of 180 is used as the evaluation surface (hereinafter abbreviated as "#180 set drop strength"). Therefore, in order to increase the #180 set drop strength, it is necessary to increase $CS_{50}$.

Patent Literature 1 discloses that in an ion exchange process at a first stage of a chemical strengthening process performed a plurality of times, $CS_{50}$ is increased by performing ion exchange to a limit where the glass does not self-break. However, in the related art, the #180 set drop strength is insufficient, and in order to further improve the #180 set drop strength, there is a demand for a chemically strengthened glass that maximizes $CS_{50}$.

Therefore, an object of the present invention is to provide a chemically strengthened glass that maximizes $CS_{50}$ and achieves an excellent #180 set drop strength, and a method for manufacturing the same.

When the ion exchange treatment is performed in two or more stages, in the ion exchange at a first stage (hereinafter also abbreviated as "first ion exchange"), by bringing the glass into contact with a first molten salt composition for ion exchange, ions in the first molten salt composition are exchanged with ions in the glass, and the ions in the first molten salt composition are introduced into the glass. In the ion exchange at a second stage (hereinafter also abbreviated as "second ion exchange") after the first ion exchange, the glass is brought into contact with a second molten salt composition to perform ion exchange. After the second ion exchange, simultaneously with the exchange between the ions in the molten salt composition and the ions in the glass, diffusion in the glass of the ions introduced from the first molten salt composition into the glass in the first ion exchange occurs.

In the related art, the $CS_{50}$ value was thought to depend on stress characteristics of a glass material after the first ion exchange. In this regard, the present inventors found that by optimizing the diffusion, which occurs in the ion exchange process after the second ion exchange, of the ions introduced from the first molten salt composition into the glass after the first ion exchange into the glass during the second ion exchange process, $CS_{50}$ can take a maximum value. Furthermore, the present inventors also found that there is a correlation between K-DOL, which represents a depth of a compressive stress layer caused by potassium ions from the glass surface, and $CS_{50}$, and completed the present invention based on these findings.

The present invention provides a chemically strengthened glass and a method for producing a chemically strengthened glass in the following configuration.

1. A chemically strengthened glass having a K-DOL defined as below of 5 μm or less, and having a value $CS_{50}$/(K-DOL×t) obtained by dividing a compressive stress $CS_{50}$ (MPa) at a depth of 50 μm from a surface of the chemically strengthened glass by a product of the K-DOL (μm) and a sheet thickness t (mm) of 45 (MPa/(μm·mm)) or more, K-DOL: depth value (μm) from a glass surface of a compressive stress layer caused by K ions.

2. The chemically strengthened glass according to above 1, in which a CTave (MPa) represented by the following Formula (1) is equal to or less than a CTA value (MPa) represented by the following Formula (2), $$CTave=ICT/L_{CT} \quad \text{Formula (1).}$$

[Math. 1]

$$CTA=317.93\times K1c/\sqrt{1000}t+228.5\times 1000t-398 \quad \text{Formula (2)}$$

t: sheet thickness (mm)

ICT: integrated value (Pa·m) of tensile stress $L_{CT}$: sheet thickness direction length (μm) of tensile stress area K1c: fracture toughness value (MPa·m$^{1/2}$) of chemically strengthened glass 3. The chemically strengthened glass according to above 1 or 2, in which when the sheet thickness is t (mm), the $CS_{50}$ is 206×t−15 (MPa) or more.

4. The chemically strengthened glass according to any one of above 1 to 3, in which when the sheet thickness is 0.6 mm, a set drop strength measured by a sandpaper set drop strength test under the following condition is 60 cm or more, condition: an electronic device mounted with the chemically strengthened glass, or an electronic device simulated structure in which the chemically strengthened glass and a housing that holds the chemically strengthened glass are integrated, is dropped from a height of 30 cm on a #180 sandpaper; if the chemically strengthened glass is not broken, the drop height is increased by 5 cm and dropping is performed again; as long as the chemically strengthened glass is not broken after being dropped, the step of dropping from a height increased by 5 cm is repeated; a height at which the chemically strengthened glass is broken for the first time is defined as a breaking height; a drop test is performed using 10 samples, and an average breaking height of the 10 samples is defined as the set drop strength.

5. The chemically strengthened glass according to any one of above 1 to 4, in which when the sheet thickness is 0.5 mm, a set drop strength measured by a sandpaper set drop strength test under the following condition is 50 cm or more, condition: an electronic device mounted with the chemically strengthened glass, or an electronic device simulated structure in which the chemically strengthened glass and a housing that holds the chemically strengthened glass are integrated, is dropped from a height of 30 cm on a #180 sandpaper; if the chemically strengthened glass is not broken, the drop height is increased by 5 cm and dropping is performed again; as long as the chemically strengthened glass is not broken after being dropped, the step of dropping from a height increased by 5 cm is repeated; a height at which the chemically strengthened glass is broken for the first time is defined as a breaking height; a drop test is performed using 10 samples, and an average breaking height of the 10 samples is defined as the set drop strength.

6. The chemically strengthened glass according to any one of above 1 to 5, in which a value obtained by dividing a compressive stress CS (MPa) by the K-DOL (μm) is 230 (MPa/μm) or more.

7. The chemically strengthened glass according to any one of above 1 to 6, in which a compressive stress value $CS_0$ at a depth of 0 μm from the surface is 800 MPa or more and 1200 MPa or less.

8. The chemically strengthened glass according to any one of above 1 to 7, in which a compressive stress value $CS_1$ at a depth of 1 μm from the surface is 450 MPa or more.

9. The chemically strengthened glass according to any one of above 1 to 8, in which when the sheet thickness is t (mm), a compressive stress layer depth DOC is 150×t+20 (μm) or less.

10. A chemically strengthened glass having a ratio of 0.20 or less, the ratio being obtained by dividing a charge amount (kV) when charged for 30 seconds and after 60 seconds from completion of charging by a maximum charge amount (kV) during charging, provided that the charge amount is measured by a static honest meter.

11. The chemically strengthened glass according to any one of above 1 to 10, in which the charge amount (kV) when charged for 30 seconds and after 60 seconds from completion of charging is 0.20 (kV) or less, provided that the charge amount is measured by a static honest meter.

12. A chemically strengthened glass having a value obtained by dividing a molar amount of K ions at a depth of 3 μm from a surface layer by a molar amount of Na ions at a depth of 50 μm from the surface layer of 0.4 or less.

13. A method for manufacturing a chemically strengthened glass, the method including:

a first ion exchange treatment of bringing a glass for chemical strengthening into contact with a first molten salt composition; and a second ion exchange treatment of bringing the glass for chemical strengthening into contact with a second molten salt composition after the first ion exchange treatment to obtain a chemically strengthened glass, in which the chemically strengthened glass has a K-DOL defined as below of 5 μm or less, and the chemically strengthened glass has a value $CS_{50}$/(K-DOL×t) obtained by dividing a compressive stress $CS_{50}$ (MPa) at a depth of 50 μm from a surface of the chemically strengthened glass by a product of the K-DOL (μm) and a sheet thickness t (mm) of 45 (MPa/(μm·mm)) or more, K-DOL: depth value (μm) from a glass surface of a compressive stress layer caused by K ions.

14. The method for manufacturing a chemically strengthened glass according to above 13, in which in the first ion exchange treatment, a temperature of the first molten salt composition is 380° C. or more, and in the second ion exchange treatment, a temperature of the second molten salt composition is 430° C. or less.

15. The method for manufacturing a chemically strengthened glass according to above 13 or 14, in which the second molten salt composition contains Na ions, or contains Na ions and Li ions.

16. The method for manufacturing a chemically strengthened glass according to above 13 or 14, in which in the second ion exchange treatment, a contact time between the glass for chemical strengthening and the second molten salt composition is 65 minutes or less.

17. An electronic device product including a chemically strengthened glass as a component, in which the chemically strengthened glass has a K-DOL defined as below of 5 μm or less, and the chemically strengthened glass has a value $CS_{50}$/(K-DOL×t) obtained by dividing a compressive stress $CS_{50}$ (MPa) at a depth of 50 μm from a surface of the chemically strengthened glass by a product of the K-DOL (μm) and a sheet thickness t (mm) of the chemically strengthened glass of 45 (MPa/(μm·mm)) or more, K-DOL: depth value (μm) from a glass surface of a compressive stress layer caused by K ions.

18. An electronic device product including a chemically strengthened glass as a component, in which the chemically strengthened glass has a ratio of 0.20 or less, the ratio is obtained by dividing a charge amount (kV) when charged for 30 seconds and after 60 seconds from completion of charging by a maximum charge amount (kV) during charging, provided that the charge amount is measured by a static honest meter.

19. A glass for chemical strengthening including, in terms of mol % based on oxides:

52% to 75% of $SiO_2$;

10% to 20% of $Al_2O_3$;

5% to 12% of $Li_2O$; and

0% to 4% of $K_2O$, in which a total of $Li_2O$+$Na_2O$+$K_2O$ (hereinafter referred to as R) is in a range of 10≤R≤25.

20. A glass for chemical strengthening including, in terms of mol % based on oxides:

52% to 75% of $SiO_2$;

10% to 20% of $Al_2O_3$;

5% to 12% of $Li_2O$;

0% to 10% of $B_2O_3$;

0% to 10% of $P_2O_5$;

0% to 10% of $Na_2O$;

0% to 4% of $K_2O$;

0% to 5% of MgO;

0% to 5% of CaO;

0% to 10% of $ZrO_2$; and

0% to 10% of $TiO_2$, in which a total of $Li_2O$+$Na_2O$+$K_2O$ (hereinafter referred to as R) is in a range of 10≤R≤25.

21. The glass for chemical strengthening according to above 19 or 20, in which $Al_2O_3$/R (hereinafter referred to as Q) is in a range of Q≤0.7, 1.2≤Q.

22. The glass for chemical strengthening according to above 19 or 20, in which ($Li_2O$/R)×($Na_2O$/R)×($K_2O$/R) (hereinafter referred to as S) is in a range of 0<S≤0.025.

23. The glass for chemical strengthening according to any one of above 19 to 22, having a fracture toughness value $K1_C$ of 0.75 MPa·$m^{1/2}$ or more.

24. A chemically strengthened glass including, in terms of mol % based on oxides:

52% to 75% of $SiO_2$;

10% to 20% of $Al_2O_3$; and

5% to 12% of $Li_2O$, in which a K-DOL defined as below is 5 μm or less, and a total of $Li_2O$+$Na_2O$+$K_2O$ (hereinafter referred to as R) is in a range of 10≤R≤25, K-DOL: depth value (μm) from a glass surface of a compressive stress layer caused by K ions.

25. A chemically strengthened glass including, in terms of mol % based on oxides:

52% to 75% of $SiO_2$;
10% to 20% of $Al_2O_3$;
5% to 12% of $Li_2O$;
0% to 10% of $B_2O_3$;
0% to 10% of $P_2O_5$;
0% to 10% of $Na_2O$;
0% to 2.5% of $K_2O$;
0% to 5% of MgO;
0% to 5% of CaO;
0% to 10% of $ZrO_2$; and
0% to 10% of $TiO_2$, in which
a K-DOL defined as below is 5 μm or less, and
a total of $Li_2O+Na_2O+K_2O$ (hereinafter referred to as R) is in a range of $10 \leq R \leq 25$, K-DOL: depth value (μm) from a glass surface of a compressive stress layer caused by K ions.

26. The chemically strengthened glass according to above 24 or 25, in which
$(Li_2O/R)\times(Na_2O/R)\times(K_2O/R)$ (hereinafter referred to as S) is in a range of $0<S\leq 0.025$.

27. The chemically strengthened glass according to any one of above 24 to 26, in which
$Al_2O_3/R$ (hereinafter referred to as Q) is in a range of $Q\leq 0.7$, $1.2\leq Q$.

28. The chemically strengthened glass according to any one of above 24 to 27, having a fracture toughness value $K1_C$ of 0.75 $MPa\cdot m^{1/2}$ or more.

The chemically strengthened glass according to one aspect of the present invention has a $CS_{50}$ maximized stress profile owing to having a K-DOL of 5 μm or less and can achieve a higher set drop strength than the related art. According to the method for manufacturing the chemically strengthened glass of the present invention, by setting K-DOL to 5 μm or less, it becomes possible to design a stress profile that maximizes $CS_{50}$, and it is possible to manufacture a chemically strengthened glass exhibiting a set drop strength higher than the related art.

DESCRIPTION OF EMBODIMENTS

Figure 1:
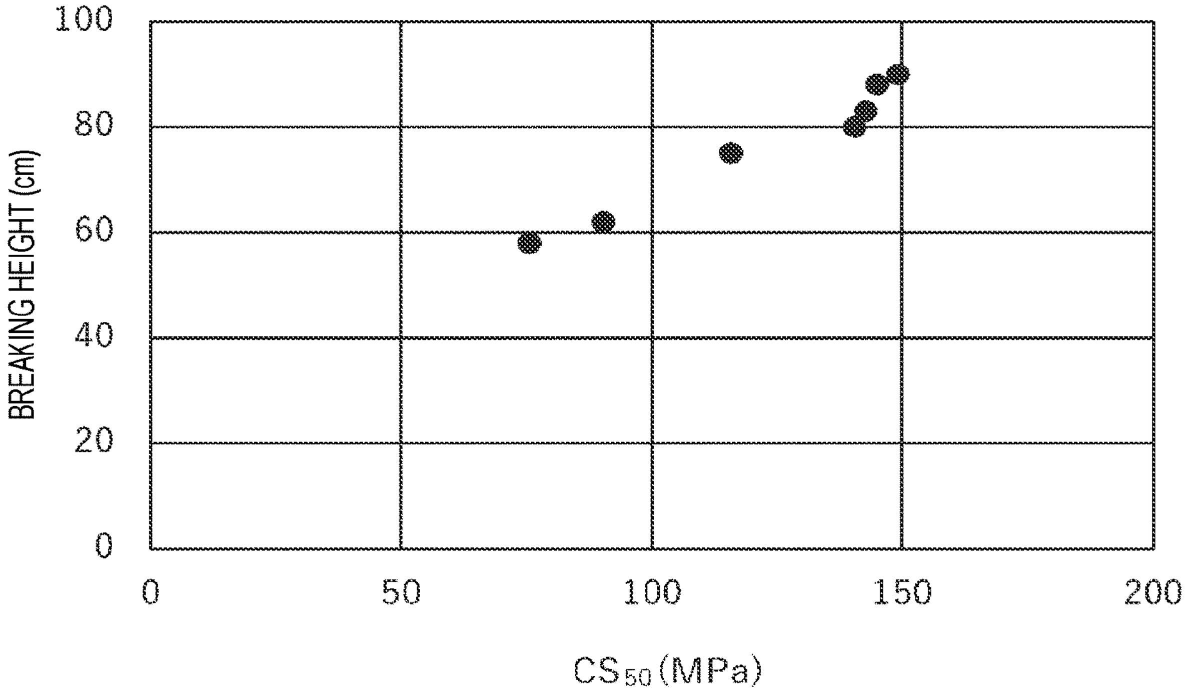
FIG. 1 is a diagram showing a correlation between $CS_{50}$ and a set drop strength.

In the present description, "to" indicating a numerical range is used in the sense of including the numerical values set forth before and after the "to" as a lower limit value and an upper limit value. Further, in the present description, a composition (content of each component) of glass will be represented by molar percentage based on oxides unless otherwise specified, and mol % is simply written as "%".

In the present description, "substantially not contained" means that a component has a content less than an impurity level contained in raw materials and the like, that is, the component is not intentionally added. Specifically, the content is less than 0.1%, for example.

Hereinafter, a "chemically strengthened glass" refers to a glass after chemical strengthening treatment, and a "glass for chemical strengthening" refers to a glass before chemical strengthening treatment.

Stress Measurement Method

In recent years, a glass that has undergone two-stage chemical strengthening by exchanging lithium ions inside the glass with sodium ions (Li-Na exchange), and then exchanging the sodium ions inside the glass with potassium ions (Na-K exchange) on a surface layer portion of the glass has become mainstream for a cover glass of a smartphone and the like.

In order to obtain a stress profile of such a chemically strengthened glass in a non-destructive manner, for example, a scattered light photoelastic stress meter (hereinafter, also abbreviated as SLP), a film stress measurement (hereinafter, also abbreviated as FSM), and the like may be used in combination.

In the method using the scattered light photoelastic stress meter (SLP), a compressive stress derived from the Li—Na exchange can be measured inside the glass at a distance of several tens of μm or more from a glass surface layer.

On the other hand, in the method of using the film stress measurement (FSM), a compressive stress derived from Na—K exchange can be measured in a glass surface layer portion, which is at a distance of several tens of μm or less from a glass surface (for example, WO2018/056121A1 and WO2017/115811A1).

Therefore, as the stress profile in the glass surface layer and inside of the two-stage chemically strengthened glass, a combination of SLP information and FSM information may be used.

In the present invention, the stress profile measured mainly by the scattered light photoelastic stress meter (SLP) is used. Note that in the present description, a compressive stress CS, a tensile stress CT, a compressive stress layer depth DOC, and the like mean values in a SLP stress profile.

The scattered light photoelastic stress meter is a stress measuring device including: a polarization phase difference variable member that changes a polarization phase difference of laser light by one wavelength or more with respect to a wavelength of the laser light; an imaging element that acquires a plurality of images by imaging, a plurality of times at predetermined time intervals, scattered light emitted when the laser beam having the varied polarization phase difference is incident on a strengthened glass; and a calculation unit that measures a periodic luminance change of the scattered light using the plurality of images, calculates a phase change of the luminance change, and calculates stress distribution in a depth direction from a surface of the strengthened glass based on the phase change.

A method for measuring the stress profile using the scattered light photoelastic stress meter includes a method described in WO2018/056121A1. Examples of the scattered light photoelastic stress meter include SLP-1000 and SLP-2000 manufactured by Orihara industrial Co., Ltd. Combining attached software SlpIV_up3 (Ver.2019.01.10.001) with these scattered light photoelastic stress meters enables highly accurate stress measurement.

K-DOL

"K-DOL" in the present description means a depth of a compressive stress layer caused by K ions resulting from Na—K exchange in a glass surface layer portion of several tens of μm or less from a glass surface. K-DOL has a correlation with a depth at which K ions changing from the glass surface are equal to K ions in a center of the glass, and is a numerical value that can be approximated. K-DOL can also be measured as a measurement limit value of a compressive stress layer depth measured by the film stress measurement (FSM).

CTave

"CTave" in the present description is calculated by the following Formula (1). CTave is a value corresponding to an average value of tensile stress, and is a value obtained by integrating stress values of a tensile stress area over a full sheet thickness and dividing the integrated value by a length of the tensile stress area.

$$CTave = ICT/L_{CT} \qquad \text{Formula (1)}$$

ICT: integrated value (MPa·m) of tensile stress $L_{CT}$: sheet thickness direction length (μm) of tensile stress area

CTA

CTA is obtained by the following Formula (2). CTA corresponds to a CT limit and is a value determined by a composition of the glass for chemical strengthening.

[Math. 2]

$$CTA = 317.93 \times K1c/\sqrt{1000}t + 228.5 \times 1000t - 398 \qquad \text{Formula (2)}$$

t: sheet thickness (mm)

K1c: fracture toughness value ($MPa \cdot m^{1/2}$)

$CS_0$

"$CS_0$" in the present description refers to a compressive stress value (MPa) at a depth of 0 μm from the glass surface measured with the film stress measurement.

$CS_{50}$

"$CS_{50}$" in the present description refers to a compressive stress value (MPa) at a depth of 50 μm from the glass surface measured with the scattered light photoelastic stress meter. As described above, the set drop strength is an index that can reflect a strength of a glass-based material when used as a product. In the set drop strength test, the chemically strengthened glass is dropped, in a state as a product mounted on an electronic device such as a smartphone, or a state of being laminated on a structure that simulates an electronic device such as a smartphone, onto an evaluation surface fixed in a horizontal state, so as to evaluate a state when broken.

In the set drop strength test, especially, it is known that stress at a specific depth from the glass surface is effective for evaluation surfaces with large surface roughness such as asphalt and sandpaper. Specifically, the set drop strength when the evaluation surface is a sandpaper with a count of 60 to 100 has a positive correlation with the stress at a depth of 90 μm from the surface. The set drop strength when the evaluation surface is a sandpaper with a count of 100 to 140 has a positive correlation with the stress at a depth of 70 μm from the surface. The set drop strength when the evaluation surface is a sandpaper with a count of 160 to 200 has a positive correlation with the stress at a depth of 50 μm from the surface.

As shown in FIG. 1, there is a positive correlation between the set drop strength when a sandpaper with a count of 180 is used as the evaluation surface and $CS_{50}$ from the glass surface, and $CS_{50}$ is a value that greatly contributes to improvement of #180 set drop strength. Therefore, by increasing the value of $CS_{50}$, the #180 set drop strength can be increased.

When a glass article is dropped onto an asphalt-paved road or grit, a crack may occur due to collision with a protrusion such as a grit object. Although a length of the crack depends on a size of the grit object with which the glass article collides, in the case where a value of the compressive stress $CS_{50}$ (MPa) at a depth of 50 μm from the glass surface is set large, for example, a stress profile having a large compressive stress around the depth of 50 μm is formed, and the glass article can be prevented from breaking into fragments even when colliding with a relatively large protrusion.

$K_2O$ Concentration, $Na_2O$ Concentration and $Li_2O$ Concentration

In the present description, the $K_2O$ concentration, $Na_2O$ concentration and $Li_2O$ concentration at a depth of x (μm) is measured at a cross section in a sheet thickness direction with an electron probe micro analyzer (EPMA). The EPMA measurement is specifically performed, for example, as follows.

First, a glass sample is embedded in an epoxy resin and mechanically polished in directions perpendicular to a first main surface and a second main surface opposite to the first main surface to prepare a cross-sectional sample. A C coat is applied to the cross section after polishing, and measurement is performed using EPMA (JXA-8500F manufactured by JEOL Ltd.). A line profile of X-ray intensity of $K_2O$ or $Na_2O$ is acquired at 1 μm intervals with an acceleration voltage of 15 kV, a probe current of 30 nA, and an integration time of 1000 msec./point. The obtained $K_2O$ concentration profile or $Na_2O$ concentration profile is calculated by proportionally converting a count of a full sheet thickness to mol %, with an average count of a central portion in the sheet thickness (0.5×t)±25 μm (assuming the sheet thickness as t μm) as a bulk composition.

Chemically Strengthened Glass

The chemical strengthening treatment is a treatment in which, by a method of immersing a glass into a melt of a metal salt (for example, sodium nitrate or potassium nitrate) containing metal ions having a large ion radius (typically, sodium ions or potassium ions), applying or straying the melt onto the glass, the glass is brought into contact with the metal salt, and thus metal ions having a small ion radius (typically, lithium ions or sodium ions) in the glass are substituted with the metal ions having a large ion radius (typically, sodium ions or potassium ions for lithium ions, and potassium ions for sodium ions) in the metal salt.

Reasons why $CS_{50}$ can be maximized by the chemically strengthened glass according to the present embodiment (hereinafter also abbreviated as "the present chemically strengthened glass") will be explained using one embodiment. In the present embodiment, a glass for chemical strengthening is ion-exchanged by a chemical strengthening treatment including a first ion exchange treatment for ion exchange by bringing the glass for chemical strengthening into contact with a first molten salt composition, and a second ion exchange treatment for ion exchange by bringing the glass for chemical strengthening into contact with a second molten salt composition after the first ion exchange treatment.

Figure 2A:
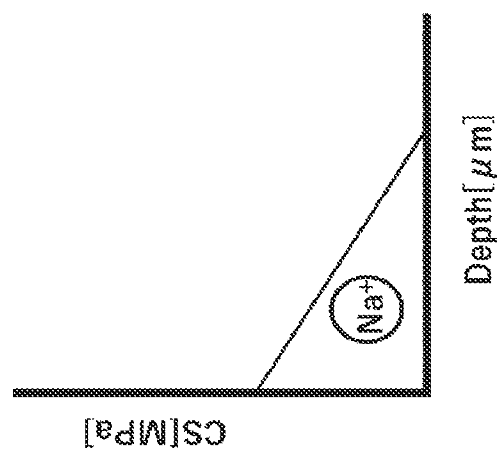
FIGS. 2A to 2C are schematic diagrams for explaining ion exchange in one embodiment.
Figure 2B:
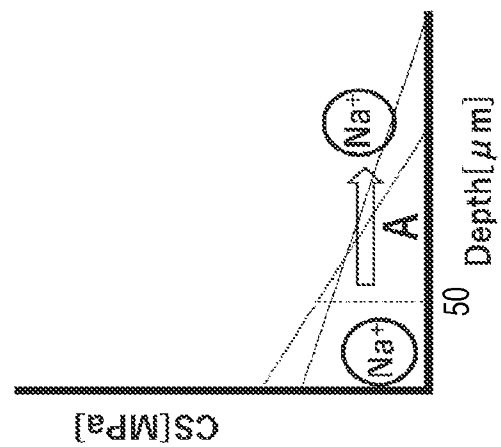
Figure 2C:
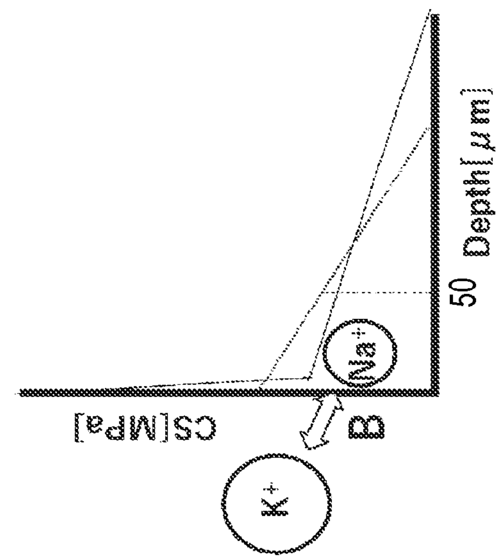

FIGS. 2A to 2C show schematic diagrams for explaining ion exchange in the present embodiment. FIG. 2A shows the first ion exchange treatment, and FIGS. 2B and 2C show the second ion exchange treatment. In the first ion exchange treatment, as shown in FIG. 2A, by ion exchange between first alkali metal ions (lithium ions) in the glass for chemical strengthening and second alkali metal ions (sodium ions) in the first molten salt composition, the second alkali metal ions are introduced into the glass.

As shown in FIGS. 2B and 2C, the second ion exchange treatment causes ion movements indicated by the following A and B.

A. In an area having a depth of 0 μm to 50 μm from the glass surface, the second alkali metal ions (sodium ions) are diffused into an area having a depth of greater than 50 μm from the glass surface. In this way, a surface layer compressive stress that contributes to the set drop strength can be formed [FIG. 2B].

B. Third alkali metal ions are introduced into the glass surface layer by ion exchanging between the third alkali metal ions (potassium ions) in the second molten salt composition and the second alkali metal ions in the glass for chemical strengthening [FIG. 2C]. In this way, the surface layer compressive stress of the glass can be improved.

Figure 3B:
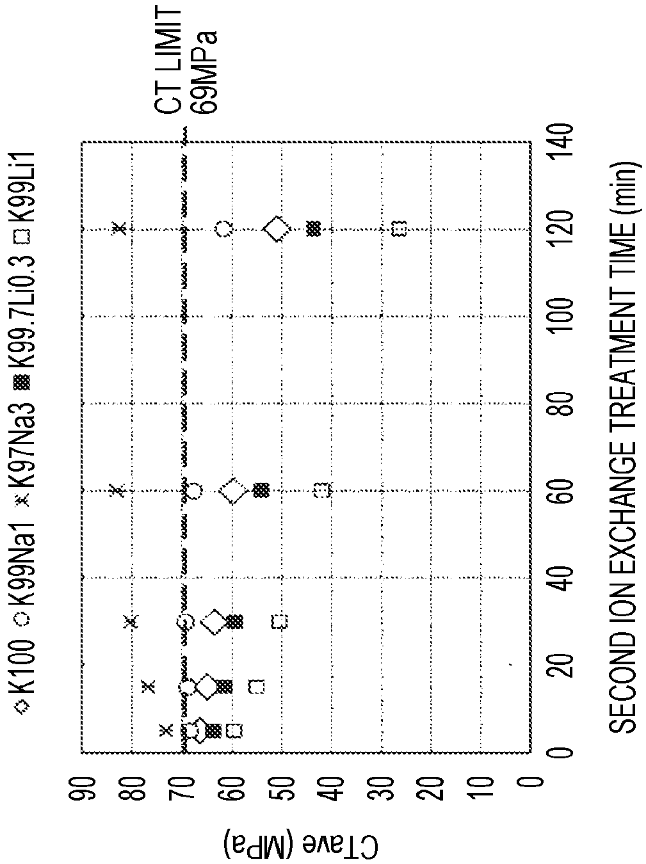
FIG. 3B is a diagram showing a correlation between the treatment time of the second ion exchange and CTave.
Figure 3A:
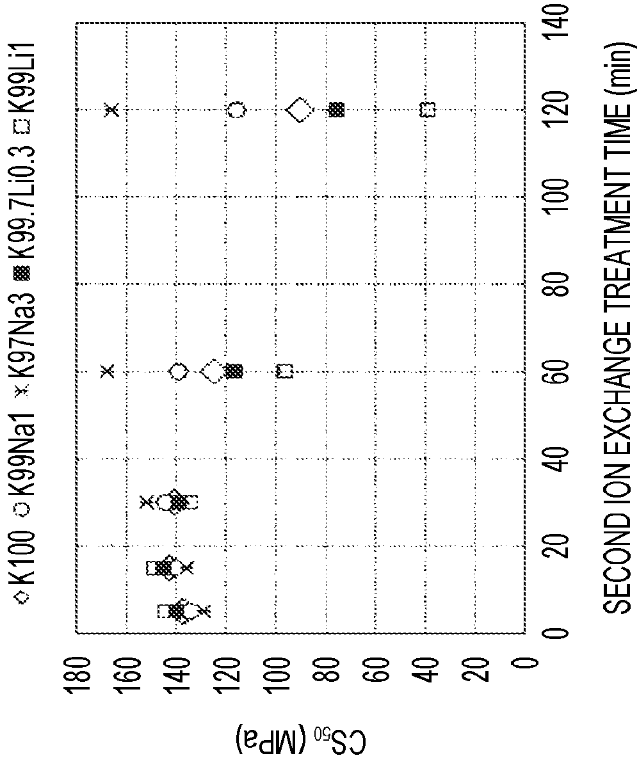
FIG. 3A is a diagram showing a correlation between a treatment time of second ion exchange and $CS_{50}$.

FIG. 3A is a diagram showing a correlation between a treatment time of the second ion exchange and $CS_{50}$. As shown in FIG. 3A, the present inventors found that there is a peak value of $CS_{50}$ for the treatment time of the second ion exchange. It means that in the treatment time of the second ion exchange that takes the peak value of $CS_{50}$, diffusion of the second alkali metal ions in the second ion exchange treatment was optimized for the $CS_{50}$ value.

FIG. 3B is a diagram showing a correlation between the treatment time of the second ion exchange and CTave corresponding to an average tensile stress. As shown in FIG. 3B, when a composition of the second molten salt composition contains excess second alkali metal ions, although the peak value of $CS_{50}$ is high, CTave may exceed CT limit.

Figure 4:
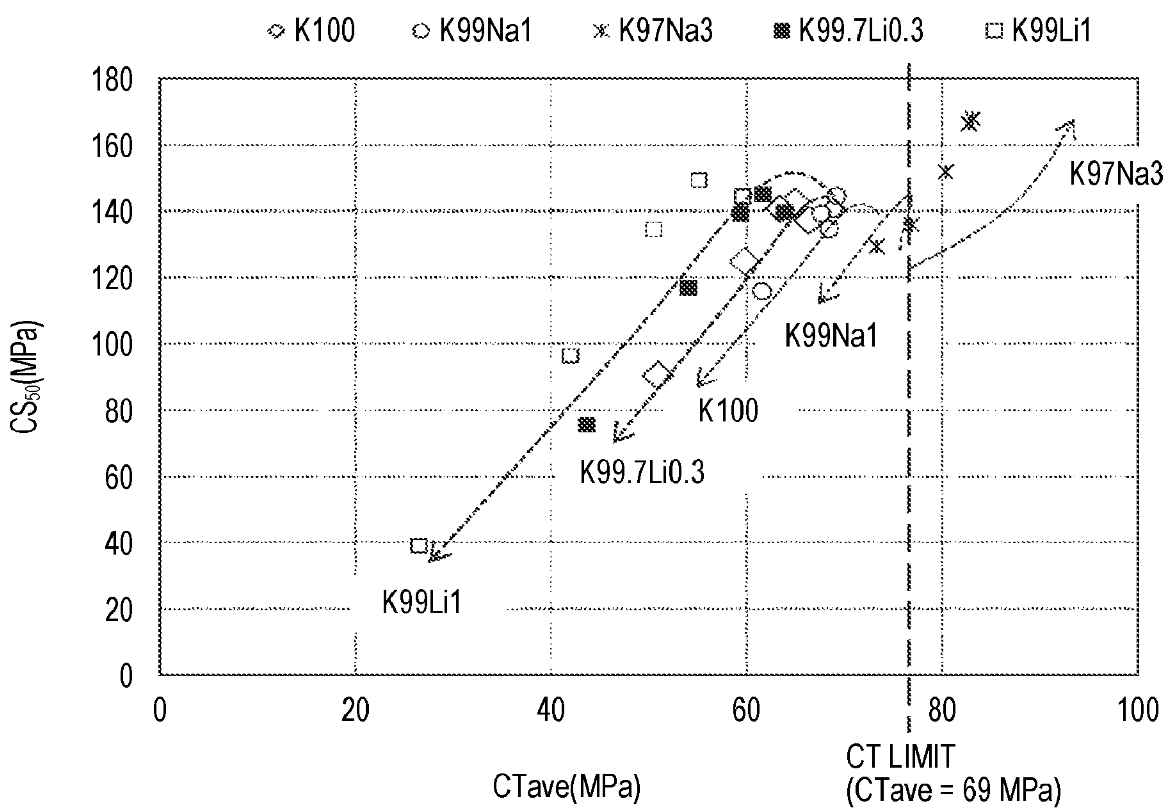
FIG. 4 is a diagram showing a correlation between CTave and $CS_{50}$.

FIG. 4 is a diagram showing a correlation between CTave and $CS_{50}$. As shown in FIG. 4, in order to maximize $CS_{50}$ without exceeding the CT limit, it is effective to design the stress profile according to the peak value of $CS_{50}$ in the second ion exchange treatment.

Figure 5B:
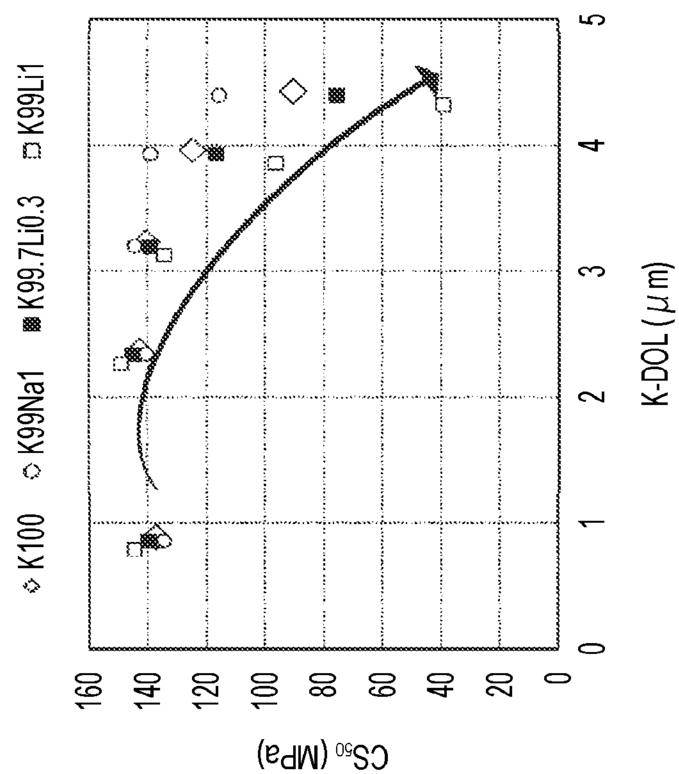
FIG. 5B is a diagram showing a correlation between K-DOL and $CS_{50}$.
Figure 5A:
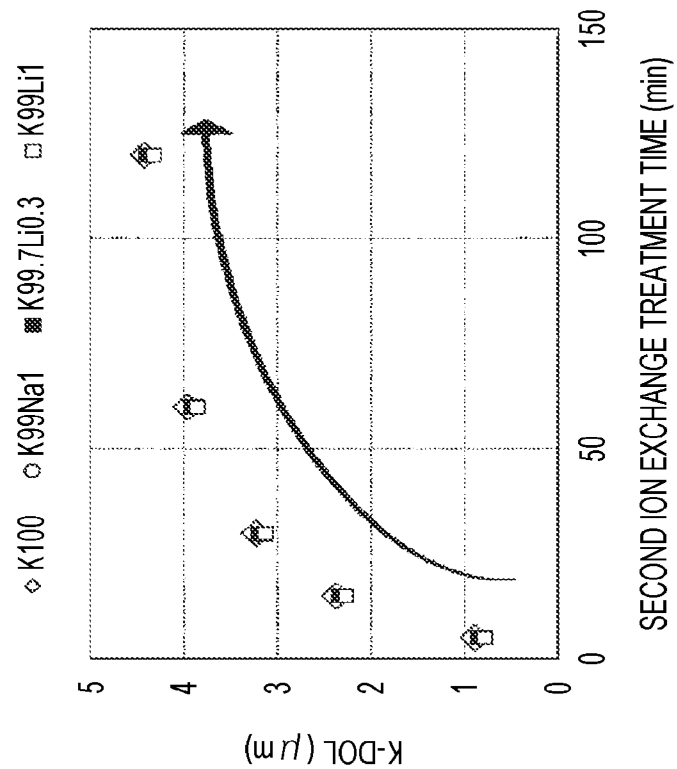
FIG. 5A is a diagram showing a correlation between the treatment time of the second ion exchange and K-DOL.

FIG. 5A is a diagram showing a correlation between the treatment time of the second ion exchange when the second ion exchange is performed at 420° C., and K-DOL. As shown in FIG. 5A, the K-DOL value increases as the treatment time of the second ion exchange increases. FIG. 5B is a diagram showing a correlation between K-DOL and $CS_{50}$. As shown in FIG. 5B, a stress profile can be designed for the peak value of $CS_{50}$ in the second ion exchange treatment by setting the K-DOL value to 5 μm or less.

Therefore, it can be seen that by controlling the K-DOL value, which is a stress value of the surface compressive stress layer, to 5 μm or less, the diffusion of the second alkali metal ions in the second ion exchange treatment can be optimized, and $CS_{50}$ can be maximized. The present chemically strengthened glass achieves a high set drop strength that could not be achieved in the related art by maximizing $CS_{50}$ by controlling the K-DOL value, which is the stress value of the surface compressive stress layer, to 5 μm or less.

In U.S. Pat. No. 9,359,251B2 (Patent Literature 1), a stress profile with a K-DOL greater than 10 μm is disclosed as an example. In U.S. Pat. No. 10,150,698B2 (Patent Literature 2), a chemically strengthened glass with specified ranges of CS and DOC is disclosed, and a stress profile with a K-DOL greater than 5 μm and less than or equal to 10 μm is disclosed as an example. WO2018/186402A1 (Patent Literature 3) discloses a chemically strengthened glass in which a total amount of compressive stress is a certain value or less.

However, none of these literatures pays attention to the correlation between K-DOL and $CS_{50}$ in improving the strength, or discloses or suggests maximizing $CS_{50}$ by reducing the K-DOL value to 5 μm or less as in the present chemically strengthened glass.

Hereinafter, as specific examples of the present chemically strengthened glass, first to fourth embodiments will be described.

Chemically Strengthened Glass of First Embodiment

The chemically strengthened glass of the first embodiment is characterized by having a K-DOL defined as below of 5 μm or less, and having a value obtained by dividing the compressive stress $CS_{50}$ (MPa) at a depth of 50 μm from a surface by a product of K-DOL (μm) and a sheet thickness t (mm), that is, $CS_{50}$/(K-DOL×t), of 45 (MPa/(μm·mm)) or more.

K-DOL: depth value (μm) from a glass surface of a compressive stress layer caused by K ions Since K-DOL is 5 μm or less, the diffusion of the second alkali metal ions in the glass can be optimized, and $CS_{50}$ can be maximized, and thus a higher set drop strength than related art can be achieved. From the viewpoint of further increasing $CS_{50}$, K-DOL is preferably 4 μm or less, more preferably 3.5 μm or less, and further preferably 3 μm or less. From the viewpoint of further increasing bending strength of the chemically strengthened glass, K-DOL is preferably 0.5 μm or more, more preferably 1 μm or more, further preferably 1.5 μm or more, and most preferably 2 μm or more.

Since $CS_{50}$/(K-DOL×t) (MPa/(μm·mm)) is 45 or more, $CS_{50}$ can be maximized while avoiding exceeding the CT limit. From the viewpoint of further maximizing $CS_{50}$, $CS_{50}$/(K-DOL×t) (MPa/(μm·mm)) is preferably 50 or more, more preferably 60 or more, and further preferably 70 or more.

In the chemically strengthened glass of the present embodiment, CTave obtained by the following Formula (1) is preferably equal to or less than the CTA value (MPa) shown by the following Formula (2). Since CTave is equal to or less than CTA value (MPa), $CS_{50}$ can be maximized while avoiding exceeding the CT limit. From the viewpoint of further avoiding the CT limit when the sheet thickness is 0.7 mm, a value obtained by subtracting the CTave value from the CTA value is preferably 1 MPa or more, more preferably 3 MPa or more, and further preferably 5 MPa or more.

$$\mathrm{CTave}=\mathrm{ICT}/L_{CT} \quad \text{Formula (1)}$$

ICT: integrated value (Pa·m) of tensile stress $L_{CT}$: sheet thickness direction length (μm) of tensile stress area

[Math. 3]

$$\mathrm{CTA}=317.93\times K1c/\sqrt{1000t}+228.5\times 1000t-398 \quad \text{Formula (2)}$$

t: sheet thickness (mm)

K1c: fracture toughness value ($MPa\cdot m^{1/2}$)

K-DOL and CTave can be appropriately adjusted depending on a glass composition of the glass for chemical strengthening, ion exchange treatment conditions (for example, treatment time and temperature of ion exchange, and types of ions contained in the molten salt composition), and the like.

When the chemically strengthened glass of the present embodiment has a sheet thickness of t (mm), $CS_{50}$ (MPa) is preferably 206×t−15 or more, more preferably 206×t−5 or more, further preferably 206×t+5 or more, and most preferably 206×t+10 or more.

When $CS_{50}$ (MPa) is 200×t or more, superior set drop strength is exhibited.

When the chemically strengthened glass of the present embodiment has a sheet thickness of 0.6 mm, the set drop strength measured by a sandpaper set drop strength test under the following conditions is preferably 60 cm or more, more preferably 65 cm or more, further preferably 70 cm or more, and most preferably 80 cm or more. When the set drop strength is 60 cm or more, excellent strength is exhibited when the glass is used as a product.

Conditions: an electronic device mounted with the chemically strengthened glass, or an electronic device simulated structure in which the chemically strengthened glass and a housing that holds the chemically strengthened glass are integrated, is dropped from a height of 30 cm on a #180 sandpaper. If the chemically strengthened glass is not broken, the drop height is increased by 5 cm and dropping is performed again. As long as the chemically strengthened glass is not broken after being dropped, the step of dropping from a height increased by 5 cm is repeated. A height at which the chemically strengthened glass is broken for the first time is defined as a breaking height. A drop test is performed using 10 samples, and an average breaking height of the 10 samples is defined as the set drop strength.

When the chemically strengthened glass of the present embodiment has a sheet thickness of 0.5 mm, the set drop strength measured by a sandpaper set drop strength test under the following conditions is preferably 50 cm or more, more preferably 55 cm or more, further preferably 65 cm or more, and most preferably 75 cm or more. When the set drop strength is 50 cm or more, excellent strength is exhibited when the glass is used as a product.

Conditions: an electronic device mounted with the chemically strengthened glass, or an electronic device simulated structure in which the chemically strengthened glass and a housing that holds the chemically strengthened glass are integrated, is dropped from a height of 30 cm on a #180 sandpaper. If the chemically strengthened glass is not broken, the drop height is increased by 5 cm and dropping is performed again. As long as the chemically strengthened glass is not broken after being dropped, the step of dropping from a height increased by 5 cm is repeated. A height at which the chemically strengthened glass is broken for the first time is defined as a breaking height. A drop test is performed using 10 samples, and an average breaking height of the 10 samples is defined as the set drop strength.

In a stress profile of the chemically strengthened glass of the present embodiment, in which a horizontal axis is the depth x (μm) from the surface and a vertical axis is the compressive stress CS (MPa), regardless of the sheet thickness, an absolute value of a slope CS-slope of the surface layer compressive stress from the glass surface to K-DOL is preferably 230 (MPa/μm) or more, more preferably 260 (MPa/μm) or more, further preferably 300 (MPa/μm) or more, and most preferably 330 (MPa/μm) or more.

Since the absolute value of CS-slope is 230 (MPa/μm) or more, the $CS_{50}$ value can be further increased while avoiding exceeding the CT limit. The slope CS-slope of the surface layer compressive stress from the glass surface to K-DOL is a value uniquely determined by a straight line connecting a start point and an end point of the stress profile.

The chemically strengthened glass of the present embodiment preferably has $CS_0$ of 800 MPa or more, more preferably 850 MPa or more, and further preferably 900 MPa or more. It is preferable that $CS_0$ is 800 MPa or more so that the glass is hard to break due to deformation such as bending. As $CS_0$ becomes larger, a non-defective product rate in manufacturing may become lower, and therefore, $CS_0$ is preferably 1200 MPa or less, and more preferably 1100 MPa or less.

From the viewpoint of maintaining four-point bending strength, the chemically strengthened glass of the present embodiment preferably has a compressive stress value $CS_1$ of 450 MPa or more at a depth of 1 μm from the glass surface. $CS_1$ is more preferably 500 MPa or more, further preferably 550 MPa or more, and most preferably 600 MPa or more.

When the chemically strengthened glass of the present embodiment has a sheet thickness of t mm, the compressive stress layer depth DOC (μm) is preferably 150×t+20 or less so that the diffusion of the second alkali metal ions can be optimized and $CS_{50}$ can be further increased. DOC (μm) is more preferably 150×t+15 or less, and further preferably 150×t+10 or less. A lower limit of DOC (μm) is not particularly limited, but from the viewpoint of increasing the strength, DOC is preferably 150×t−10 or more, and more preferably 150×t or more.

Examples of one embodiment of the present invention include a chemically strengthened glass having a ratio of 0.20 or less obtained by dividing a charge amount (kV) when charged for 30 seconds and after 60 seconds from completion of charging by a maximum charge amount (kV) during charging, and the charge amount is measured by a static honest meter such as "H-0110-S4" manufactured by Shishido Electrostatic, Ltd. The ratio is preferably 0.15 or less, more preferably 0.10 or less, and further preferably 0.05 or less.

In order to make a ratio obtained by dividing a charge amount (kV), which is measured by a static honest meter such as "H-0110-S4" manufactured by Shishido Electrostatic, Ltd., after 90 seconds from a start of charging by the maximum charge amount (kV) in 90 seconds to 0.20 or less, the chemically strengthened glass of the present embodiment preferably has a "K-CSarea" (MPa·μm) value, which is an integrated value of the surface layer compressive stress value "$CS_0$" (MPa) measured with a film stress measurement and the K ions compressive stress layer depth "K-DOL" (μm) of 10,000 or less. The K-CSarea value is more preferably 8,000 or less, further preferably 6,000 or less, even preferably 4,000 or less, and most preferably 2,000 or less.

The chemically strengthened glass of the present embodiment preferably has a compressive stress $CS_{90}$ of 20 MPa or more at a depth of 90 μm from the surface, so that it is possible to prevent the present chemically strengthened glass from breaking when a mobile terminal or the like including the present chemically strengthened glass as a cover glass is dropped on coarse sand or the like. $CS_{90}$ is more preferably 30 MPa or higher, and further preferably 40 MPa or higher.

Chemically Strengthened Glass of Second Embodiment

As described above, by controlling the K-DOL value, which is a stress value of the surface compressive stress layer, the diffusion of the second alkali metal ions in the second ion exchange treatment can be optimized, and $CS_{50}$ can be maximized. The value of K-DOL is the depth of the compressive stress layer caused by K ions, and is a value that indicates a correlation with the K ion concentration. Therefore, by controlling the K ion concentration in the glass surface layer, $CS_{50}$ can be maximized.

The chemically strengthened glass according to the second embodiment is characterized by having a value (hereinafter also abbreviated as molar ratio), which is obtained by dividing a molar amount of K ions at a depth of 3 μm from the surface by a molar amount of Na ions at a depth of 50 μm from the surface, of 0.5 or less.

Figure 6:
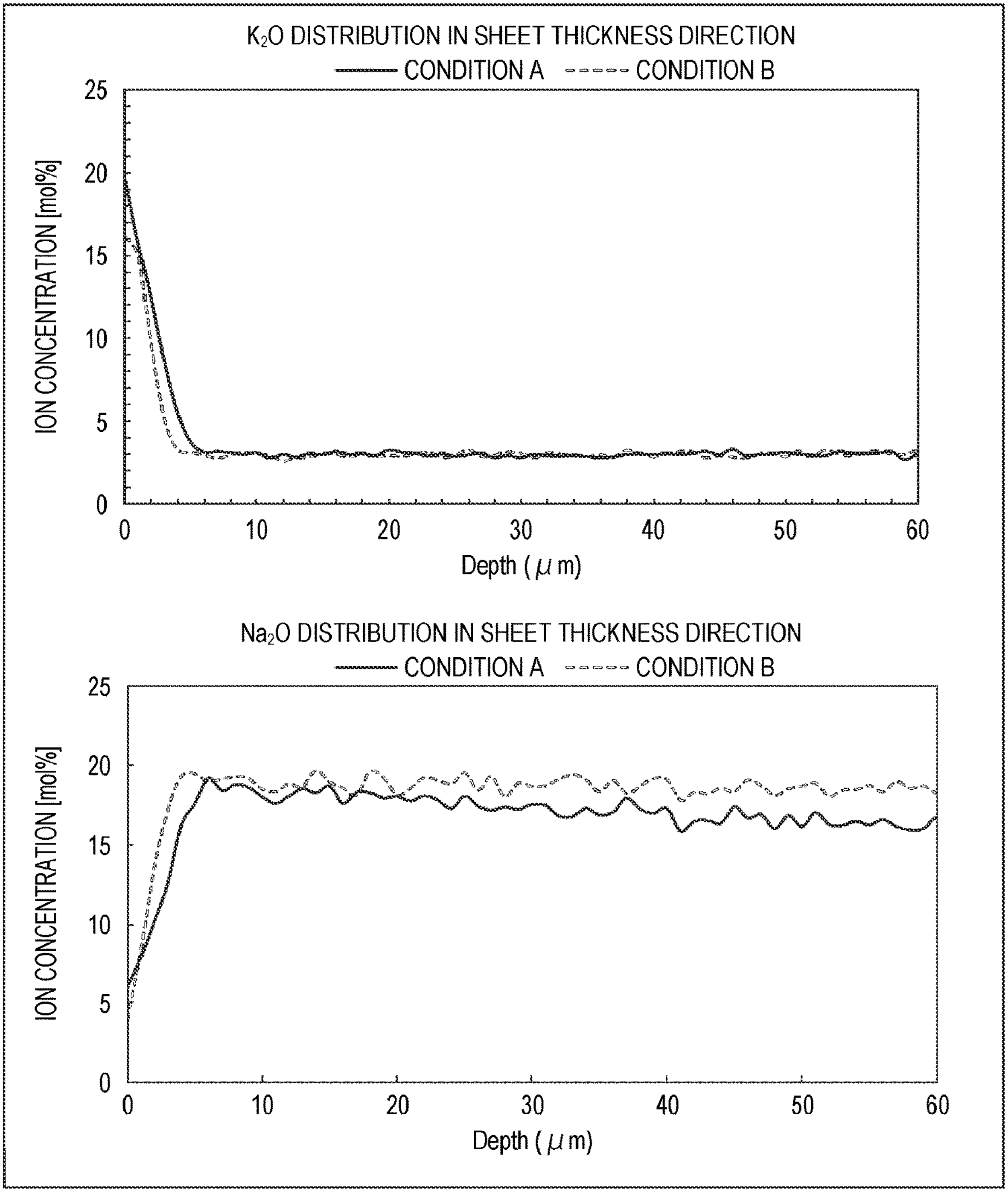
FIG. 6 is a diagram showing profiles of K ions and Na ions from a glass surface to a depth of 60 μm.

Since the chemically strengthened glass of the present embodiment has a molar ratio of 0.5 or less, the introduction of the second alkali metal ions in the surface layer in the second ion exchange treatment is optimized, and the $CS_{50}$ can be maximized, and a higher set drop strength than related art can be achieved. FIG. 6 shows a distribution of K ions and Na ions from the surface layer to a depth of 60 μm under two types of strengthening conditions. Table 8 shows the chemical strengthening treatment conditions for each condition, and a molar amount of K ions at a depth of 3 μm and a molar amount of Na ions at a depth of 50 μm. The molar ratio is more preferably 0.4 or less, further preferably 0.3 or less, and most preferably 0.2 or less.

Chemically Strengthened Glass of Third Embodiment

The chemically strengthened glass of the third embodiment is a chemically strengthened glass containing, in terms of mol % based on oxides, 52% to 75% of $SiO_2$, 10% to 20% of $Al_2O_3$, and 5% to 12% of $Li_2O$, in which K-DOL is 5 μm or less, and a total of $Li_2O+Na_2O+K_2O$ (hereinafter referred to as R) is in a range of $10 \leq R \leq 25$. A base composition of the chemically strengthened glass of the third embodiment is preferably in the form of a glass y, which will be described later.

Since K-DOL of the chemically strengthened glass of the third embodiment is 5 μm or less, the diffusion of the second alkali metal ions in the glass can be optimized, and $CS_{50}$ can be maximized, and thus a higher set drop strength than related art can be achieved. From the viewpoint of further increasing $CS_{50}$, K-DOL is preferably 4 μm or less, more preferably 3.5 μm or less, and further preferably 3 μm or less. From the viewpoint of further increasing the bending strength of the chemically strengthened glass, K-DOL is preferably 0.5 μm or more, more preferably 1 μm or more, further preferably 1.5 μm or more, and most preferably 2 μm or more.

Chemically Strengthened Glass of Fourth Embodiment

The chemically strengthened glass of the fourth embodiment is a chemically strengthened glass containing, in terms of mol % based on oxides, 52% to 75% of $SiO_2$, 10% to 20% of $Al_2O_3$, 5% to 12% of $Li_2O$, 0% to 10% of $B_2O_3$, 0% to 10% of $P_2O_5$, 0% to 10% of $Na_2O$, 0% to 2.5% of $K_2O$, 0% to 5% of MgO, 0% to 5% of CaO, 0% to 10% of $ZrO_2$, and 0% to 10% of $TiO_2$, in which K-DOL is 5 μm or less, and a total of $Li_2O+Na_2O+K_2O$ is in a range of $10 \leq R \leq 25$. A base composition of the chemically strengthened glass of the fourth embodiment is preferably in the form of a glass y, which will be described later.

Since K-DOL of the chemically strengthened glass of the fourth embodiment is 5 μm or less, the diffusion of the second alkali metal ions in the glass can be optimized, and $CS_{50}$ can be maximized, and thus a higher set drop strength than related art can be achieved. From the viewpoint of further increasing $CS_{50}$, K-DOL is preferably 4 μm or less, more preferably 3.5 μm or less, and further preferably 3 μm or less. From the viewpoint of further increasing the bending strength of the chemically strengthened glass, K-DOL is preferably 0.5 μm or more, more preferably 1 μm or more, further preferably 1.5 μm or more, and most preferably 2 μm or more.

The chemically strengthened glass of the fourth embodiment is preferable from the viewpoint of improving K1C, which contributes to the drop strength, to 0.75 or more while reducing charging characteristics.

Base Composition of Chemically Strengthened Glass and Composition of Glass for Chemical Strengthening A base composition of the present chemically strengthened glass and a composition of the glass for chemical strengthening used in a method for manufacturing the chemically strengthened glass of the present embodiment will be described. In the present description, the "base composition of the chemically strengthened glass" is a composition of the glass for chemical strengthening, and except for the case where extreme ion exchange treatment is performed, the glass composition of a portion at a depth greater than the compressive stress layer depth of the chemically strengthened glass is substantially the same as the base composition of the chemically strengthened glass.

The chemically strengthened glass in the present invention is preferably a lithium-containing glass, and more preferably a lithium aluminosilicate glass. The composition of the glass for chemical strengthening and the base composition of the chemically strengthened glass obtained by chemically strengthening the glass for chemical strengthening are the same with each other. Although the composition of the chemically strengthened glass is not particularly limited, the chemically strengthened glass may contain crystals. Specific examples thereof include embodiments of a glass x or y described below.

Hereinafter, the glasses x and y will be described.

Glass x

In the embodiment of the glass x, more specifically, the chemically strengthened glass preferably has a base composition containing, in terms of mol % based on oxides, 52% to 75% of $SiO_2$, 8% to 20% of $Al_2O_3$, and 5% to 16% of $Li_2O$.

A preferable composition of the glass x will be described below.

In the glass for chemical strengthening in the present embodiment, $SiO_2$ is a component that forms a network structure of glass. $SiO_2$ is also a component that increases chemical durability.

The content of $SiO_2$ is preferably 52% or more. The content of $SiO_2$ is more preferably 56% or more, further preferably 60% or more, particularly preferably 64% or more, and extremely preferably 68% or more. On the other hand, the content of $SiO_2$ is preferably 75% or less, more preferably 73% or less, further preferably 71% or less, and particularly preferably 69% or less in order to improve meltability.

$Al_2O_3$ is a component that increases the surface compressive stress by chemical strengthening and is essential. The content of $Al_2O_3$ is preferably 8% or more, more preferably 10% or more, 11% or more, 12% or more, 13% or more in this order, further preferably 14% or more, and particularly preferably 15% or more. On the other hand, the content of $Al_2O_3$ is preferably 20% or less, more preferably 18% or less, further preferably 17% or less and 16% or less in this order, and most preferably 15% or less in order to prevent a devitrification temperature of the glass from becoming too high.

$Li_2O$ is a component that forms the compressive stress by ion exchange, and is essential since it is a constituent component of main crystal. The content of $Li_2O$ is preferably 5% or more, more preferably 7% or more, and further preferably 10% or more. On the other hand, the content of $Li_2O$ is preferably 16% or less, more preferably 15% or less, further preferably 14% or less, and most preferably 12% or less in order to stabilize the glass.

$Na_2O$ is a component that improves meltability of the glass. $Na_2O$ is not essential, but in the case where $Na_2O$ is contained, the content thereof is preferably 1% or more, more preferably 2% or more, and particularly preferably 5% or more. In the case where the amount of $Na_2O$ is too large, crystals are less likely to precipitate or chemical strengthening characteristics deteriorate, and therefore, the content of $Na_2O$ is preferably 15% or less, more preferably 12% or less, and particularly preferably 10% or less.

Similar to $Na_2O$, $K_2O$ is also a component that lowers the melting temperature of the glass and may be contained.

In the case where $K_2O$ is contained, the content thereof is preferably 0.5% or more, more preferably 0.8% or more, and further preferably 1% or more. In the case where the amount of $K_2O$ is too large, the chemical strengthening characteristics or the chemical durability decreases, and therefore, the content thereof is preferably 1% or less, more preferably 0.8% or less, further preferably 0.6% or less, particularly preferably 0.5% or less, and most preferably 0.4% or less.

A total content of $Na_2O$ and $K_2O$, that is $Na_2O+K_2O$, is preferably 3% or more, and more preferably 5% or more, in order to improve the meltability of the glass raw materials. A ratio of the content of $K_2O$ to the total content of $Li_2O$, $Na_2O$ and $K_2O$ (hereinafter referred to as $R_2O$), that is $K_2O/R_2O$, is preferably 0.2 or less so that the chemical strengthening characteristics can be enhanced and the chemical durability can be improved. $K_2O/R_2O$ is more preferably 0.15 or less, further preferably 0.10 or less. $R_2O$ is preferably 10% or more, more preferably 12% or more, and further preferably 15% or more. $R_2O$ is preferably 20% or less, and more preferably 18% or less.

$P_2O_5$ is a component that enlarges the compressive stress layer by chemical strengthening and may be contained. In order to enlarge the compressive stress layer, the content of $P_2O_5$ is preferably 0.5% or more, more preferably 1% or more, further preferably 1.5% or more, particularly preferably 2% or more, and extremely preferably 2.5% or more.

On the other hand, in the case where the content of $P_2O_5$ is too high, phase separation tends to occur during melting and acid resistance is remarkably lowered, and therefore, the content of $P_2O_5$ is preferably 5% or less, more preferably 4.8% or less, further preferably 4.5% or less, and particularly preferably 4.2% or less.

$ZrO_2$ is a component that increases mechanical strength and chemical durability, and is preferably contained in order to remarkably improve CS. The content of $ZrO_2$ is preferably 0.5% or more, more preferably 1% or more, further preferably 1.5% or more, particularly preferably 2% or more, and most preferably 2.5% or more.

On the other hand, in order to prevent devitrification during melting, the content of $ZrO_2$ is preferably 8% or less, more preferably 7.5% or less, further preferably 7% or less, and particularly preferably 6% or less. In the case where the content of $ZrO_2$ is too high, the devitrification temperature rises and then viscosity decreases. In order to prevent deterioration of moldability due to such a decrease in viscosity, in the case where a molding viscosity is low, the content of $ZrO_2$ is preferably 5% or less, more preferably 4.5% or less, and further preferably 3.5% or less.

MgO is a component that stabilizes the glass, and is also a component that enhances the mechanical strength and chemical resistance, and therefore, MgO is preferably contained in the case where the content of $Al_2O_3$ is relatively low. The content of MgO is preferably 1% or more, more preferably 2% or more, further preferably 3% or more, and particularly preferably 4% or more.

On the other hand, in the case where too much MgO is added, the viscosity of the glass is lowered, and devitrification or phase separation tends to occur. The content of MgO is preferably 20% or less, more preferably 19% or less, further preferably 18% or less, and particularly preferably 17% or less.

$TiO_2$ is a component that stabilizes the glass structure and may be contained. $TiO_2$ is not essential, but in the case where $TiO_2$ is contained, the content thereof is preferably 0.05% or more, and more preferably 0.1% or more. On the other hand, the content of $TiO_2$ is preferably 1% or less, more preferably 0.5% or less, and further preferably 0.3% or less, in order to prevent the devitrification during melting.

$Y_2O_3$ is a component that has an effect of making it difficult for fragments to scatter in the case where the chemically strengthened glass is broken, and may be contained. The content of $Y_2O_3$ is preferably 1% or more, more preferably 1.5% or more, further preferably 2% or more, particularly preferably 2.5% or more, and extremely preferably 3% or more. On the other hand, in order to prevent the devitrification during melting, the content of $Y_2O_3$ is preferably 5% or less, and more preferably 4% or less.

$B_2O_3$ is a component that improves chipping resistance of the glass for chemical strengthening or the chemically strengthened glass and improves the meltability, and may be contained. In the case where $B_2O_3$ is contained, the content thereof is preferably 0.5% or more, more preferably 1% or more, and further preferably 2% or more, in order to improve the meltability. On the other hand, in the case where the content of $B_2O_3$ is too high, striae may occur during melting, or phase separation tends to occur, and then the quality of the glass for chemical strengthening tends to deteriorate. Thus the content thereof is preferably 10% or less. The content of $B_2O_3$ is more preferably 8% or less, further preferably 6% or less, and particularly preferably 4% or less.

All of BaO, SrO, MgO, CaO and ZnO are components that improve the meltability of the glass and may be contained.

All of $La_2O_3$, $Nb_2O_5$ and $Ta_2O_5$ are components that make it difficult for fragments to scatter in the case where the chemically strengthened glass is broken, and may be contained in order to increase a refractive index. In the case where these components are contained, a total content of $La_2O_3$, $Nb_2O_5$ and $Ta_2O_5$ (hereinafter referred to as $La_2O_3+Nb_2O_5+Ta_2O_5$) is preferably 0.5% or more, more preferably 1% or more, further preferably 1.5% or more, and particularly preferably 2% or more. $La_2O_3+Nb_2O_5+Ta_2O_5$ is preferably 4% or less, more preferably 3% or less, further preferably 2% or less, and particularly preferably 1% or less so that the devitrification in the glass is less likely to occur during melting.

$CeO_2$ may be contained. $CeO_2$ may prevent coloring by oxidizing the glass. In the case where $CeO_2$ is contained, the content thereof is preferably 0.03% or more, more preferably 0.05% or more, and further preferably 0.07% or more. The content of $CeO_2$ is preferably 1.5% or less, and more preferably 1.0% or less, in order to increase transparency.

In the case where the chemically strengthened glass is colored for use, coloring components may be added within a range that does not impede achievement of desired chemical strengthening characteristics. Examples of the coloring component include $Co_3O_4$, $MnO_2$, $Fe_2O_3$, NiO, CuO, $Cr_2O_3$, $V_2O_5$, $Bi_2O_3$, $SeO_2$, $Er_2O_3$ and $Nd_2O_3$.

A total content of the coloring components is preferably in a range of 1% or less. In the case where it is desired to increase visible light transmittance of the glass, it is preferred that these components are not substantially contained.

$HfO_2$, $Nb_2O_5$, and $Ti_2O_3$ may be added in order to increase weather resistance against irradiation with ultraviolet light. When added for the purpose of increasing weather resistance against irradiation with ultraviolet light, a total content of $HfO_2$, $Nb_2O_5$, and $Ti_2O_3$ is preferably 1% or less, more preferably 0.5% or less, and further preferably 0.1% or less in order to reduce effects on other characteristics.

$SO_3$, chlorides, and fluorides may be appropriately contained as refining agents during melting of the glass. A total content of components that function as the refining agent is, in terms of mass % based on oxides, preferably 2% or less, more preferably 1% or less, and further preferably 0.5% or less, since in the case where the refining agent is too much added, strengthening characteristics may be affected. Although a lower limit thereof is not particularly limited, the total content is typically preferably 0.05% or more in terms of mass % based on oxides.

In the case where $SO_3$ is used as the refining agent, the content of $SO_3$ is, in terms of mass % based on oxides, preferably 0.01% or more, more preferably 0.05% or more, and further preferably 0.1% or more, since in the case where the content is too small, the effect thereof cannot be achieved. In the case where $SO_3$ is used as the refining agent, the content of $SO_3$ is, in terms of mass % based on oxides, preferably 1% or less, more preferably 0.8% or less, and further preferably 0.6% or less.

In the case where Cl is used as the refining agent, the content of Cl is, in terms of mass % based on oxides, preferably 1% or less, more preferably 0.8% or less, and further preferably 0.6% or less, since in the case where Cl is added too much, physical properties such as the strengthening characteristics may be affected. In the case where Cl is used as the refining agent, the content of Cl is, in terms of mass % based on oxides, preferably 0.05% or more, more preferably 0.1% or more, and further preferably 0.2% or more, since in the case where the content is too low, the effect thereof cannot be achieved.

In the case where $SnO_2$ is used as the refining agent, the content of $SnO_2$ is, in terms of mass % based on oxides, preferably 1% or less, more preferably 0.5% or less, and further preferably 0.3% or less, since in the case where $SnO_2$ is added too much, the glass structure may be affected. In the case where $SnO_2$ is used as the refining agent, the content of $SnO_2$ is, in terms of mass % based on oxides, preferably 0.02% or more, more preferably 0.05% or more, and further preferably 0.1% or more, since in the case where the content is too low, the effect thereof cannot be achieved.

$As_2O_3$ is preferably not contained. In the case where $Sb_2O_3$ is contained, the content thereof is preferably 0.3% or less, more preferably 0.1% or less, and most preferably not contained.

Glass y

In the embodiment of the glass y, more specifically, the chemically strengthened glass preferably has a base composition containing, in terms of mol % based on oxides, 52% to 75% of $SiO_2$, 10% to 20% of $Al_2O_3$, 5% to 12% of $Li_2O$, and 0% to 4% of $K_2O$.

More specifically, a composition containing 52% to 75% of $SiO_2$, 10% to 20% of $Al_2O_3$, 5% to 12% of $Li_2O$, 0% to 10% $B_2O_3$, 0% to 10% of $P_2O_5$, 0% to 10% of $Na_2O$, 0% to 4% of $K_2O$, 0% to 5% of MgO, 0% to 5% of CaO, 0% to 10% of $ZrO_2$, and 0% to 10% of $TiO_2$ is preferred.

A preferred glass composition for the glass y will be described below.

The preferred glass compositions of $SiO_2$, $Al_2O_3$, and $Li_2O$ in the glassy are the same as those described above in the section of (Glass x).

$B_2O_3$ is a component that improves the chipping resistance of the glass for chemical strengthening or the chemically strengthened glass and improves the meltability, and may be contained. In the case where $B_2O_3$ is contained, the content thereof is preferably 0.5% or more, more preferably 1% or more, and further preferably 2% or more, in order to improve the meltability. On the other hand, in the case where the content of $B_2O_3$ is too high, striae may occur during melting, or phase separation tends to occur, and then the quality of the glass for chemical strengthening tends to deteriorate, thus the content thereof is preferably 10% or less. The content of $B_2O_3$ is more preferably 8% or less, further preferably 6% or less, and particularly preferably 4% or less.

$P_2O_5$ is a component that enlarges the compressive stress layer by chemical strengthening and may be contained. In the glass y, in order to increase the compressive stress, the content of $P_2O_5$ is preferably 0.5% or more, more preferably 1% or more, further preferably 1.5% or more, particularly preferably 2% or more, and extremely preferably 2.5% or more.

On the other hand, in the case where the content of $P_2O_5$ is too high, phase separation tends to occur during melting and acid resistance is remarkably lowered, and therefore, the content of $P_2O_5$ is preferably 10% or less, more preferably 9.0% or less, further preferably 7.5% or less, and particularly preferably 5.0% or less.

$Na_2O$ is a component that improves the meltability of the glass. $Na_2O$ is not essential, but in the case where $Na_2O$ is contained, the content thereof is preferably 1% or more, more preferably 2% or more, and particularly preferably 5% or more. In the case where the amount of $Na_2O$ is too large, the chemical strengthening characteristics deteriorate, and therefore, the content of $Na_2O$ is preferably 10% or less, more preferably 8% or less, and particularly preferably 7% or less.

Similar to $Na_2O$, $K_2O$ is also a component that lowers the melting temperature of the glass and may be contained.

In the case where $K_2O$ is contained, the content thereof is preferably 0.5% or more, more preferably 0.8% or more, and further preferably 1% or more. In the case where the amount of $K_2O$ is too large, the chemical strengthening characteristics or the chemical durability decreases, and therefore, the content thereof is, for example, 4% or less, preferably 2.5% or less, more preferably 2.0% or less, further preferably 1.2% or less, particularly preferably 0.8% or less, and most preferably 0.5% or less.

MgO is a component that stabilizes the glass, and is also a component that enhances the mechanical strength and chemical resistance, and therefore, MgO is preferably contained in the case where the content of $Al_2O_3$ is relatively low. The content of MgO is preferably 1% or more, more preferably 2% or more, and further preferably 3% or more.

On the other hand, in the case where too much MgO is added, the viscosity of the glass is lowered, and devitrification or phase separation tends to occur. The content of MgO is preferably 5% or less, and more preferably 4% or less.

CaO is a component that improves the meltability of glass and may be contained. In the glass y, the content of CaO is preferably in a range of 0% to 5%, and more preferably in a range of 0% to 3%.

$ZrO_2$ is a component that increases the mechanical strength and the chemical durability, and is preferably included in order to remarkably improve CS. In the glass y, the content of $ZrO_2$ is preferably 0.5% or more, more preferably 1% or more, further preferably 1.5% or more, particularly preferably 2% or more, and most preferably 2.5% or more.

On the other hand, in order to prevent devitrification during melting, in the glass y, the content of $ZrO_2$ is preferably 10% or less, more preferably 8.5% or less, further preferably 7% or less, and particularly preferably 6% or less. In the case where the content of $ZrO_2$ is too high, the devitrification temperature rises and then the viscosity decreases. In order to prevent deterioration of moldability due to such a decrease in viscosity, in the case where the molding viscosity is low, the content of $ZrO_2$ is preferably 5% or less, more preferably 4.5% or less, and further preferably 3.5% or less.

$TiO_2$ is a component that stabilizes the glass structure and may be contained. In the glass y, TiO2 is not essential, but in the case where $TiO_2$ is contained, the content thereof is preferably 0.5% or more, and more preferably 1.0% or more. On the other hand, the content of $TiO_2$ is preferably 10% or less, more preferably 9.0% or less, and further preferably 8.0% or less, in order to prevent the devitrification during melting.

Preferred glass compositions of other components in the glassy are the same as those described above in the section of (Glass x).

In the glass y, a total R of $Li_2O+Na_2O+K_2O$ is preferably in a range of $10 \le R \le 25$, more preferably in a range of $12 \le R \le 23$, and further preferably in a range of $14 \le R \le 21$, from the viewpoint of improving resistance to basic substances.

In the glass y, $Al_2O_3/R$ (hereinafter referred to as Q) is preferably in a range of $Q \le 0.7$ and $1.2 \le Q$, and more preferably $Q \le 0.6$ and $1.3 \le Q$, from the viewpoint of improving alkali ion exchange characteristics of the glass.

In the glass y, $(Li_2O/R) \times (Na_2O/R) \times (K_2O/R)$ (hereinafter referred to as S) preferably satisfies $0 < S \le 0.025$, more preferably $0.00010 \le S \le 0.010$, and further preferably $0.0002 \le S \le 0.0050$, from the viewpoint of reducing electrical resistance.

In the glass y, the electrical resistance can be evaluated by surface resistivity. Here, the surface resistivity is a value of surface resistance per unit area. The surface resistivity of one main surface of the glass correlates with ease with which charges move in a direction parallel to the direction of the main surface, and the higher the surface resistivity, the more difficult it is for the charges to flow in the direction parallel to the direction of the main surface. Therefore, the surface resistivity is a value that has little correlation with the sheet thickness of the glass.

The smaller S is, the smaller the surface resistivity is, but when S becomes 0, the surface resistivity may show a large value discontinuously. Especially when $Li_2O$ is not contained in the glass composition, the surface resistivity increases.

From the viewpoint of reducing a charge amount on the glass surface, the surface resistivity is, for example, 10 [log Ω/sq] or less, preferably 9.7 [log Ω/sq] or less, more preferably 9.5 [log Ω/sq] or less, further preferably 9.0 [log Ω/sq] or less, and most preferably 8.8 [log Ω/sq] or less.

In the glass y, from the viewpoint of improving a drop strength, K1c, which is the fracture toughness value ($MPa \cdot m^{1/2}$) is preferably 0.75 or more, more preferably 0.80 or more, and further preferably 0.85 or more.

Table 1 shows one embodiment of the base composition of chemically strengthened glass. As a base composition of a chemically strengthened glass suitable for the embodiment of the glass y, among glass materials A to O shown in table 1, the glass materials F, H, I, and J have the same R, Q, and S ranges as the glass material A, and thus can be considered to have the same characteristics as the glass material A.

TABLE 1

| Glass material | | A | B | C | D | E | F | G | H |
|---|---|---|---|---|---|---|---|---|---|
| Composition (mol %) | $SiO_2$ | 66 | 64 | 68 | 68 | 62 | 68.5 | 63 | 58 |
| | $B_2O_3$ | 0 | 0 | 0 | 0 | 0 | 0 | 0.5 | 5 |
| | $Al_2O_3$ | 12 | 15 | 12 | 12 | 19 | 12 | 16.5 | 19 |
| | $P_2O_5$ | 0 | 2.5 | 0 | 0 | 0 | 0 | 3 | 1 |
| | $Y_2O_3$ | 1.5 | 0 | 1.5 | 1.5 | | 1.3 | 0 | 0 |
| | $Li_2O$ | 11 | 6 | 10.7 | 10.4 | 14 | 11 | 8 | 7.8 |
| | $Na_2O$ | 5 | 11 | 1.5 | 2.4 | 3 | 5.5 | 8 | 8 |
| | $K_2O$ | 3 | 0.5 | 2 | 1.3 | 2 | 1 | 0.5 | 0.1 |
| | MgO | 0.7 | 0 | 3.5 | 3.5 | 0 | 0.1 | 0.4 | 1 |
| | CaO | 0.2 | 0 | 0.2 | 0.2 | 0 | 0.1 | 0.04 | 0 |
| | SrO | 0 | 0 | 0 | 0 | 0 | 0 | 0 | 0 |
| | ZnO | 0 | 1 | 0 | 0 | 0 | 0 | 0 | 0 |
| | $ZrO_2$ | 0.5 | 0 | 0.5 | 0.6 | 0 | 0.4 | 0 | 0 |
| | $TiO_2$ | 0.1 | 0 | 0.1 | 0.1 | 0 | 0.1 | 0 | 0.1 |
| | $SnO_2$ | 0 | 0 | 0 | 0 | 0 | 0 | 0.04 | 0 |
| | $Fe_2O_3$ | 0 | 0 | 0 | 0 | 0 | 0 | 0.02 | 0 |
| | SUM | 100 | 100 | 100 | 100 | 100 | 100 | 100 | 100 |
| R | | 19 | 17.5 | 14.2 | 14.1 | 19 | 17.5 | 16.5 | 15.9 |
| $Li_2O/R$ | | 0.58 | 0.34 | 0.75 | 0.74 | 0.74 | 0.63 | 0.48 | 0.49 |
| $Na_2O/R$ | | 0.26 | 0.63 | 0.11 | 0.17 | 0.16 | 0.31 | 0.48 | 0.50 |
| $K_2O/R$ | | 0.16 | 0.03 | 0.14 | 0.09 | 0.11 | 0.06 | 0.03 | 0.01 |
| Q | | 0.63 | 0.86 | 0.85 | 0.85 | 1.0 | 0.69 | 1.0 | 1.2 |
| S | | 0.024 | 0.0062 | 0.011 | 0.012 | 0.012 | 0.011 | 0.0071 | 0.0016 |
| K1c($MPa \cdot m^{1/2}$) | | 0.82 | 0.70 | 0.82 | 0.82 | — | 0.82 | 0.73 | 0.75 |
| Young's modulus (GPa) | | 85 | 76 | 85 | 85 | 85 | 85 | 76 | 76 |
| Surface resistivity (log Ω/sq) | | 9.8 | 9.0 | 9.7 | 9.7 | 9.7 | 9.7 | 9.5 | 8.6 |

TABLE 1-continued

| Glass material | | I | J | K | L | M | N | O |
|---|---|---|---|---|---|---|---|---|
| Composition (mol %) | $SiO_2$ | 65 | 57 | 69 | 70 | 64.3 | 71 | 61 |
| | $B_2O_3$ | 3 | 6 | 4 | 0 | 0 | 0 | 0 |
| | $Al_2O_3$ | 16 | 18 | 12 | 7.5 | 8 | 4.5 | 5 |
| | $P_2O_5$ | 1 | 0.01 | 0.4 | 0 | 0 | 1 | 2 |
| | $Y_2O_3$ | 0 | 0 | 0 | 0 | 0 | 0 | 1 |
| | $Li_2O$ | 7 | 11 | 8 | 8 | 0 | 21 | 21 |
| | $Na_2O$ | 4.8 | 3 | 2 | 5.3 | 12.5 | 0.39 | 2 |
| | $K_2O$ | 0.2 | 0.2 | 0.2 | 4 | 4 | 0.1 | 0 |
| | MgO | 0.4 | 4.3 | 1 | 4 | 11 | 0 | 5 |
| | CaO | 1.4 | 0.49 | 3 | 0.2 | 0.1 | 0.01 | |
| | SrO | 1 | 0 | 0.2 | 0 | 0.1 | 0 | 0 |
| | ZnO | 0 | 0 | 0.1 | 0 | 0 | 0 | 0 |
| | $ZrO_2$ | 0 | 0 | 0.1 | 1.0 | 0 | 2 | 3 |
| | $TiO_2$ | 0.2 | 0 | 0 | 0 | 0 | 0 | 0 |
| | $SnO_2$ | 0 | 0 | 0 | 0 | 0 | 0 | 0 |
| | $Fe_2O_3$ | 0 | 0 | 0 | 0 | 0 | 0 | 0 |
| | SUM | 100 | 100 | 100 | 100 | 100 | 100 | 100 |
| R | | 12 | 14.2 | 10.2 | 17.3 | 16.5 | 21.49 | 23 |
| $Li_2O/R$ | | 0.58 | 0.77 | 0.78 | 0.46 | 0.00 | 0.98 | 0.91 |
| $Na_2O/R$ | | 0.40 | 0.21 | 0.20 | 0.31 | 0.76 | 0.02 | 0.09 |
| $K_2O/R$ | | 0.02 | 0.01 | 0.02 | 0.23 | 0.24 | 0.00 | 0.00 |
| Q | | 1.3 | 1.3 | 1.2 | 0.43 | 0.48 | 0.21 | 0.22 |
| S | | 0.0039 | 0.0023 | 0.0030 | 0.0328 | 0 | 0.000083 | 0 |
| K1c($MPa \cdot m^{1/2}$) | | 0.80 | 0.86 | 0.82 | 0.74 | 0.80 | — | — |
| Young's modulus (GPa) | | 78 | 85 | 82 | 80 | 85 | — | — |
| Surface resistivity (log Ω/sq) | | 8.8 | 8.7 | 8.8 | 12.0 | 11.0 | 11 | — |

Shape of Chemically Strengthened Glass

The present chemically strengthened glass is typically a sheet-like glass article, and may be flat or curved. There may also be portions with different thicknesses.

When the present chemically strengthened glass is sheet-shaped, the thickness (t) is preferably 3000 μm or less, more preferably 2000 μm or less, 1600 μm or less, 1500 μm or less, 1100 μm or less, 900 μm or less, 800 μm or less, and 700 μm or less in stages. In order to obtain sufficient strength by chemical strengthening treatment, the thickness (t) is preferably 300 μm or more, more preferably 400 μm or more, and further preferably 500 μm or more.

Uses of Chemically Strengthened Glass

The present chemically strengthened glass is particularly useful as a cover glass used in an electronic device such as a mobile device such as a mobile phone or a smartphone. Furthermore, it is also useful as a cover glass of electronic devices such as televisions, personal computers, and touch panels, walls of elevators, and walls (full-surface displays) of architectures such as houses and buildings that are not intended for portability. It is also useful as building materials such as window glass, table tops, interiors of automobiles, airplanes, and the like, cover glasses thereof, housings having curved surfaces, and the like.

Method for Manufacturing Chemically Strengthened Glass

A method for manufacturing the chemically strengthened glass of the present embodiment (hereinafter, also abbreviated as the present manufacturing method) is characterized by including: a first ion exchange treatment of bringing a glass for chemical strengthening into contact with a first molten salt composition, and a second ion exchange treatment of bringing the glass for chemical strengthening into contact with a second molten salt composition after the first ion exchange treatment, in which the chemically strengthened glass has a K-DOL of 5 μm or less, and a value obtained by dividing the compressive stress $CS_{50}$ (MPa) at a depth of 50 μm from the surface by a product of K-DOL (μm) and the sheet thickness t (mm), that is, $CS_{50}$/(K-DOL× t), is 45 (MPa/(μm·mm)) or more.

Since K-DOL is 5 μm or less, $CS_{50}$ can be maximized, and a higher set drop strength than related art can be achieved. From the viewpoint of further increasing $CS_{50}$, K-DOL is preferably 4 μm or less, more preferably 3 μm or less, and further preferably 2.5 μm or less. From the viewpoint of further increasing the four-point bending strength, K-DOL is preferably 0.5 μm or more, more preferably 1 μm or more, further preferably 1.5 μm or more, and most preferably 2 μm or more.

In the manufacturing method of the present embodiment, CTave (MPa) represented by the above Formula (1) is preferably equal to or less than the CTA value (MPa) represented by the following Formula (2). Since CTave is equal to or less than the value (MPa) represented by the following Formula (2), $CS_{50}$ can be maximized while avoiding exceeding the CT limit. From the viewpoint of further avoiding the CT limit, CTave is preferably equal to or less than the value (MPa) represented by the following Formula (3), more preferably equal to or less than the value (MPa) represented by the following Formula (4), and further preferably equal to or less than the value (MPa) represented by the following Formula (5). From the viewpoint of manufacturing efficiency, CTave is preferably equal to or higher than the value (MPa) represented by the following Formula (6), more preferably equal to or higher than the value (MPa) represented by the following Formula (7), and further preferably equal to or higher than the value (MPa) represented by the following Formula (8).

[Math. 4]

$$CTA=317.93\times K1c/\sqrt{1000}t+228.5\times 1000t-398 \quad \text{Formula (2)}$$

[Math. 5]

$$317.93\times K1c/\sqrt{1000}t+228.5\times 1000t-400 \quad \text{Formula (3)}$$

[Math. 6]

$$317.93\times K1c/\sqrt{1000}t+228.5\times 1000t-402 \quad \text{Formula (4)}$$

[Math. 7]

$$317.93\times K1c/\sqrt{1000t}+228.5\times 1000t-404 \quad \text{Formula (5)}$$

[Math. 8]

$$317.93\times K1c/\sqrt{1000t}+228.5\times 1000t-410 \quad \text{Formula (6)}$$

[Math. 9]

$$317.93\times K1c/\sqrt{1000t}+228.5\times 1000t-408 \quad \text{Formula (7)}$$

[Math. 10]

$$317.93\times K1c/\sqrt{1000t}+228.5\times 1000t-406 \quad \text{Formula (8)}$$

The above Formulas (2) to (8) are defined as follows.

t: sheet thickness (mm)

K1c: fracture toughness value ($MPa\cdot m^{1/2}$) of chemically strengthened glass Since $CS_{50}$/(K-DOL×t) (MPa/μm·mm) is 45 or more, $CS_{50}$ can be maximized while avoiding exceeding the CT limit. From the viewpoint of further maximizing $CS_{50}$, $CS_{50}$/(K-DOL×t) (MPa/μm·mm) is preferably 50 or more, more preferably 60 or more, further preferably 70 or more, and most preferably 80 or more.

The values of CTave and K-DOL can be appropriately adjusted depending on the composition of the glass for chemical strengthening, conditions of ion exchange treatment, and the like.

The glass for chemical strengthening in the present manufacturing method has, for example, the composition described above in the section <<Base Composition of Chemically Strengthened Glass and Composition of Glass for Chemical Strengthening>>. In order to obtain a glass having the above composition, the glass raw materials are appropriately mixed, and heated and melted in a glass melting furnace. Thereafter, the molten glass is homogenized by bubbling, stirring, addition of a refining agent, and the like, and formed into a glass sheet having a predetermined thickness, followed by annealing. Alternatively, the molten glass may be formed into a block shape, annealed, and then cut into a sheet shape.

Examples of methods for forming into a sheet shape include a float method, a press method, a fusion method, and a down-draw method. The float method is particularly preferable when manufacturing a large glass sheet. A continuous forming method other than the float method, for example, a fusion method and a down-draw method are also preferable.

In the present embodiment, the first ion exchange treatment exchanges the first alkali metal ions in the glass for chemical strengthening with the second alkali metal ions in the first molten salt composition. The second ion exchange treatment exchanges the second alkali metal ions in the glass for chemical strengthening with the third alkali metal ions in the second molten salt composition.

In the present description, the term "molten salt composition" refers to a composition containing a molten salt. Examples of the molten salt contained in the molten salt composition include nitrates, sulfates, carbonates and chlorides. Examples of nitrates include lithium nitrate, sodium nitrate, potassium nitrate, cesium nitrate, rubidium nitrate, and silver nitrate. Examples of sulfates include lithium sulfate, sodium sulfate, potassium sulfate, cesium sulfate, rubidium sulfate, and silver sulfate. Examples of chlorides include lithium chloride, sodium chloride, potassium chloride, cesium chloride, rubidium chloride, and silver chloride. These molten salts may be used alone, or may be used in combination.

The molten salt composition is preferably a composition containing nitrate as a main component, more preferably a composition containing sodium nitrate or potassium nitrate as a main component. In the present description, the term "as a main component" means that a content in the molten salt composition is 80 mass % or more.

The first ion exchange treatment and the second ion exchange treatment are described in detail below.

First Ion Exchange Treatment

In one embodiment, in the first ion exchange treatment, it is preferable to bring the glass for chemical strengthening containing the first alkali metal ions into contact with the first molten salt composition containing the second alkali metal ions having a larger ion radius than the first alkali metal ions to exchange ions. In the present embodiment, the second alkali metal ions are introduced into the glass for chemical strengthening by the first ion exchange treatment. As a result, in the subsequent second ion exchange treatment, the second alkali ions are diffused inside the glass to increase the deep stress that contributes to the set drop strength, thereby improving the set drop strength. The set drop strength when the evaluation surface is a sandpaper with a count of 60 to 100 has a positive correlation with the stress at a depth of 90 μm from the surface. The set drop strength when the evaluation surface is a sandpaper with a count of 100 to 140 has a positive correlation with the stress at a depth of 70 μm from the surface. The set drop strength when the evaluation surface is a sandpaper with a count of 160 to 200 has a positive correlation with the stress at a depth of 50 μm from the surface.

The composition of the first molten salt composition used in the first ion exchange treatment is not particularly limited as long as it does not impair the effects of the present invention, and as one embodiment, it is preferable to contain the second alkali metal ions having a larger ion radius than the first alkali metal ions contained in the glass for chemical strengthening. It is preferable that the first molten salt composition contains third alkali metal ions having a larger ion radius than the second alkali metal ions.

As one embodiment, when the first alkali metal ions are lithium ions, the second alkali metal ions are preferably sodium ions, and the third alkali metal ions are preferably potassium ions.

Examples of a molten salt containing sodium ions used in the first molten salt composition include sodium nitrate, sodium sulfate, and sodium chloride, and among these, sodium nitrate is preferred.

As one embodiment, when the first molten salt composition contains sodium nitrate, the content thereof is preferably 20 mass % or more and 80 mass % or less. Here, a lower limit of the content is more preferably 25 mass % or more, and further preferably 30 mass % or more. An upper limit of the content is more preferably 60 mass % or less, and further preferably 50 mass % or less.

Examples of the molten salt containing potassium ions used in the first molten salt composition include potassium nitrate, potassium sulfate, and potassium chloride, and among these, potassium nitrate is preferred.

As one embodiment, when the first molten salt composition contains potassium nitrate, the content thereof is preferably 20 mass % or more and 80 mass % or less. Here, a lower limit of the content is more preferably 30 mass % or more, further preferably 40 mass % or more, and most preferably 50 mass % or more. An upper limit of the content is more preferably 70 mass % or less, and further preferably 60 mass % or less.

In the first ion exchange treatment, the glass for chemical strengthening is preferably brought into contact with the first molten salt composition at 380° C. or higher. When the temperature of the first molten salt composition is 380° C. or higher, ion exchange proceeds easily. The temperature is more preferably 400° C. or higher, further preferably 410° C. or higher, and particularly preferably 420° C. or higher. The temperature of the first molten salt composition is usually 450° C. or lower from the viewpoints of danger due to evaporation and changes in composition of the molten salt composition.

In the first ion exchange treatment, a contact time of the glass for chemical strengthening with the first molten salt composition is preferably 0.5 hours or longer so that the surface compressive stress increases. The contact time is more preferably 1 hour or more. In the case where the contact time is too long, not only does productivity decrease, but the compressive stress may decrease due to a relaxation phenomenon. Therefore, the contact time is usually 8 hours or less.

The first ion exchange treatment may be a one-stage treatment, or a treatment (multi-stage strengthening) having two or more stages under two or more different conditions.

Second Ion Exchange Treatment

The second ion exchange treatment is a step, after the first ion exchange treatment, of bringing the glass for chemical strengthening into contact with the second molten salt composition having a component ratio different from the that of the first molten salt composition.

In the present manufacturing method, it is preferable that in the second ion exchange treatment, the second molten salt composition contains the third alkali metal ions having a larger ion radius than the second alkali metal ions. More preferably, the second molten salt composition further contains the first alkali metal ions, or the first alkali metal ions and the second alkali metal ions.

By containing the first alkali metal ions in the second molten salt composition, the second alkali metal ions introduced in the vicinity of the glass surface in the first ion exchange treatment diffuse into a deep layer, which occurs in equilibrium with the exchange of the second alkali metal ions with the third alkali metal ions in the second molten salt composition in the glass surface layer. As a result, the compressive stress of the glass surface layer is controlled, and the $CS_{50}$ can be maximized, so as to further improve the set drop strength against the sandpaper with a count of 160 to 200.

As one embodiment, when the second alkali metal ions are sodium ions, the third alkali metal ions are preferably potassium ions, and the first alkali metal ions are preferably lithium ions.

Examples of the molten salt containing potassium ions used in the second molten salt composition include potassium nitrate, potassium sulfate, and potassium chloride, and among these, potassium nitrate is preferred.

As one embodiment, when the second molten salt composition contains potassium nitrate, the content thereof is preferably 90 mass % or more and 100 mass % or less. Here, a lower limit of the content is more preferably 93 mass % or more, and further preferably 96 mass % or more. An upper limit of the content is more preferably 99.7 mass % or less, and further preferably 99.3 mass % or less.

The second molten salt composition preferably contains lithium ions, or lithium ions and sodium ions. Examples of the molten salt containing lithium ions used in the second molten salt composition include lithium nitrate, lithium sulfate, and lithium chloride, and among these, lithium nitrate is preferred. Examples of the composition containing sodium ions used in the second molten salt composition include sodium nitrate, sodium sulfate, and sodium chloride, and among these, sodium nitrate is preferred.

In the case where the second molten salt composition contains lithium nitrate, a content thereof is preferably 0.01 mass % or more, more preferably 0.1 mass % or more, and further preferably 0.3 mass % or more. From the viewpoint of maintaining a high surface layer stress, the content thereof is preferably 2 mass % or less, more preferably 1 mass % or less, and further preferably 0.5 mass % or less.

In the case where the second molten salt composition contains sodium nitrate, a content thereof is preferably 0.01 mass % or more, more preferably 0.1 mass % or more, and further preferably 0.3 mass % or more. From the viewpoint of maintaining a high surface layer stress, the content is preferably 2 mass % or less, and more preferably 1 mass % or less.

In the second ion exchange treatment, the glass for chemical strengthening is preferably brought into contact with the second molten salt composition at 430° C. or lower. When the temperature of the second molten salt composition is 430° C. or lower, the diffusion of the second alkali metal ions in the second ion exchange is controlled to keep the K-DOL low and easily maximize $CS_{50}$. The temperature is more preferably 420° C. or lower, further preferably 410° C. or lower, still further preferably 400° C. or lower, and particularly preferably 390° C. or lower. From the viewpoint of manufacturing efficiency, the temperature of the second molten salt composition is usually preferably 360° C. or higher, and more preferably 370° C. or higher.

As one aspect of the present manufacturing method, specifically, for example, the first molten salt composition in the first ion exchange treatment is 420° C. or higher, and the second molten salt composition in the second ion exchange treatment is 400° C. or lower.

In the second ion exchange treatment, the time for which the glass for chemical strengthening is brought into contact with the second molten salt composition is preferably 65 minutes or shorter, so that the diffusion of the second alkali metal ions in the second ion exchange is controlled and the $CS_{50}$ is easily maximized. The contact time in the second ion exchange treatment is more preferably 45 minutes or shorter, further preferably 30 minutes or shorter, and most preferably 20 minutes or shorter. From the viewpoint of reducing variations in stress characteristics within the same batch during manufacturing, the contact time in the second ion exchange treatment is usually preferably 3 minutes or longer, more preferably 5 minutes or longer, further preferably 10 minutes or longer, and most preferably 15 minutes or longer.

Electronic Device Product

An electronic device product according to one embodiment of the present invention is an electronic device product including a chemically strengthened glass as a component, and characterized in that the chemically strengthened glass has a K-DOL defined as below of 5 μm or less, and has a value obtained by dividing the compressive stress $CS_{50}$ (MPa) at a depth of 50 μm from the surface by a product of K-DOL (μm) and a sheet thickness t (mm) of the chemically strengthened glass, that is, $CS_{50}/(\text{K-DOL}\times t)$, of 45 (MPa/(μm·mm)) or more. The chemically strengthened glass in the electronic device product of the present embodiment is the same as that described above in the section of <Chemically Strengthened Glass>.

K-DOL: depth value (μm) from a glass surface of a compressive stress layer caused by K ions An electronic device product according to one embodiment of the present invention is an electronic device product including a chemically strengthened glass as a component, and characterized in that the chemically strengthened glass has a ratio of 0.20 or less obtained by dividing a charge amount (kV) when charged for 30 seconds and after 60 seconds from completion of charging by a maximum charge amount (kV) during charging, and the charge amount is measured by a static honest meter. The chemically strengthened glass in the electronic device product of the present embodiment is the same as that described above in the section of <Chemically Strengthened Glass>.

EXAMPLES

Although the present invention will be described below using Examples, the present invention is not limited to those Examples.

Production of Amorphous Glass

Glass raw materials were prepared so as to have a composition shown in below in terms of a mole percentage based on oxides, and weighed out to give 400 g of glass. Then, the mixed raw materials were put in a platinum crucible, put into an electric furnace at 1500° C. to 1700° C., melted for approximately 3 hours, defoamed, and homogenized.

Glass material A: $SiO_2$ 66%, $Al_2O_3$ 12%, $Y_2O_3$ 1.5%, $ZrO_2$ 0.5%, $Li_2O$ 11%, $Na_2O$ 5%, $K_2O$ 3%, other components 1%.

Glass material B: $SiO_2$ 64%, $Al_2O_3$ 15%, $P_2O_5$ 2.5%, ZnO 1%, $Li_2O$ 6%, $Na_2O$ 11%, other components 0.5%.

The obtained molten glass was poured into a metal mold, held at a temperature of approximately 50° C. higher than a glass transition point for 1 hour, and then cooled to room temperature at a rate of 0.5° C./min to thereby obtain a glass block. The obtained molten glass was poured into a mold, held at a temperature around a glass transition point (714° C.) for approximately 1 hour, and then cooled to room temperature at a rate of 0.5° C./min to thereby obtain a glass block.

The obtained glass blocks were cut, ground, and finally mirror-polished on both sides to obtain glass sheets having an area of 120 mm×60 mm and sheet thicknesses of 0.70 mm and 0.50 mm.

Evaluation of Chemical Strengthening Treatment and Strengthened Glass

The glass sheet obtained above was immersed in the molten salt composition under conditions shown in Tables 2 to 7, subjected to the first ion exchange treatment and the second ion exchange treatment, so as to produce the chemically strengthened glass in Examples 1 to 61 below. Examples 1 to 41, 43, 50, 52 to 56, 60, and 61 are working examples, and Examples 42, 44 to 49, 51, and 57 to 59 are comparative examples. The obtained chemically strengthened glass was evaluated by the following methods.

Measurement of Stress Performed by Scattered Light Photoelastic Stress Meter

Stress of the chemically strengthened glass was measured by the method described in WO2018/056121A1 using a scattered light photoelastic stress meter (SLP-2000 produced by Orihara Industrial Co., Ltd.). A stress profile was calculated using software [SlpV (Ver. 2019.11.07.001)] attached to the scattered light photoelastic stress meter (SLP-2000 produced by Orihara Industrial Co., Ltd.).

A function used for obtaining the stress profile is $\sigma(x)=[a_1 \times \text{erfc}(a_2 \times x)+a_3 \times \text{erfc}(a_4 \times x)+a_5]$. $a_i$ (i=1 to 5) is a fitting parameter, and erfc is a complementary error function. The complementary error function is defined by the following equation.

[Math. 11]

$$\begin{aligned} \text{erfc}(x) &= 1 - \text{erf}(x) \\ &= \frac{2}{\sqrt{\pi}} \int_x^{\infty} e^{-t^2} dt = e^{-x^2} \text{erfc}x(x) \end{aligned}$$

In the evaluation employed in the present description, the fitting parameter was optimized by minimizing a residual sum of squares of raw data obtained and the above function. Measurement processing conditions were one-shot, and regarding measurement area processing adjustment items, an edge method was designated for the surface, and 6.0 μm was designated for an inner surface edge, and automation was designated for inner left and right edges, and automation (center of the sample film thickness) was designated for an inner deep edge, and a fitting curve was designated for extension of a phase curve to a middle of a sample thickness.

The stress in the glass surface layer portion of several tens of μm or less from the glass surface was measured using a film stress measurement (FSM6000-UV manufactured by Orihara Industrial Co., Ltd.) by the methods described in WO2018/056121A1 and WO2017/115811A1.

At the same time, distributions of the concentrations of alkali metal ions (sodium ions and potassium ions) in a direction of cross section were measured using an electron probe micro analyzer (EPMA), and it was confirmed that there were no discrepancies between the stress profile obtained above and a result of this measurement.

From the obtained stress profile, the compressive stress $CS_0$, $CS_{50}$, $CS_{90}$, CTave, compressive stress layer depth DOL-zero and K-DOL were calculated by the above method. Results are shown in Tables 2 to 7.

In Tables 2 to 7, each notation represents the following.

t (mm): sheet thickness of glass sheet

K1c (MPa·$m^{1/2}$): fracture toughness value of chemically strengthened glass

CTA (MPa): value represented by the following Formula (2)

[Math. 12]

$$CTA=317.93 \times K1c/\sqrt{1000}t+228.5 \times 1000t-398 \quad \text{Formula (2)}$$

$CS_0$ (MPa): compressive stress in glass surface $CS_{50}$ (MPa): compressive stress at depth of 50 μm from glass surface $CS_{90}$ (MPa): compressive stress at depth of 90 μm from glass surface DOL-zero: surface compressive stress layer depth (μm), DOC CTave (MPa): average value of tensile stress CTave@CT limit (MPa): average value of tensile stress at CT limit K-DOL (μm): compressive stress layer depth caused by potassium ions FIG. 3A shows a result of evaluating the correlation between the treatment time of the second ion exchange and $CS_{50}$ after changing the composition of the second molten salt composition. FIG. 3B shows a result of evaluating the correlation between the treatment time of the second ion exchange and CTave after changing the composition of the second molten salt composition.

FIG. 4 shows a result of evaluating the correlation between CTave and $CS_{50}$ after changing the composition of the second molten salt composition. FIG. 5A shows a result of evaluating the correlation between the treatment time of the second ion exchange and K-DOL after changing the composition of the second molten salt composition. FIG. 5B shows a result of evaluating the correlation between K-DOL and $CS_{50}$ after changing the composition of the second molten salt composition.

Regarding FIGS. 3A, 3B, 4, 5A, and 5B, the compositions of the second molten salt composition used in the second ion exchange are shown below.

K100: 100 mass % of $KNO_3$

K99Na1: 99 mass % of $KNO_3$ and 1 mass % of $NaNO_3$

K97Na3: 97 mass % of $KNO_3$ and 3 mass % of $NaNO_3$

K99.7Li0.3: 99.7 mass % of $KNO_3$ and 0.3 mass % of $LiNO_3$

K99Li1: 99 mass % of $KNO_3$ and 1 mass % of $LiNO_3$

Set Drop Strength Test

For the drop strength test, a glass sample with a size of 120 mm×60 mm×0.7 mm or 0.6 mm was fitted into a structure whose mass and rigidity were adjusted to the size of a smartphone commonly used at the time of filing of the present application, and a pseudo smartphone housing was prepared, and a #180 SiC sandpaper was laid and fixed on a marble placed horizontally on the floor and parallel to the marble, and the pseudo smartphone housing was allowed to fall freely onto the #180 SiC sandpaper while being horizontal to the sandpaper. The glass sample was first dropped from a height of 30 cm, and if the glass sample did not break, the operation of raising the height by 5 cm and dropping the glass sample again was repeated until the glass sample broke. A height at which the glass sample broke for the first time was the breaking height. Tables 2 to 7 show results of an average breaking height when 10 pieces for each examples were subjected to the drop test as an "average set drop strength".

$K_2O$ Concentration, $Na_2O$ Concentration

In the present description, the $K_2O$ concentration and $Na_2O$ concentration at a depth x (μm) were measured by EPMA (JXA-8500F manufactured by JEOL Ltd.) in a cross section in the sheet thickness direction according to the following procedure. First, a glass sample was embedded in epoxy resin and mechanically polished in directions perpendicular to a first main surface and a second main surface opposite to the first main surface to prepare a cross-sectional sample. A C coat was applied to the cross section after polishing, and measurement was performed using EPMA. A line profile of X-ray intensity of $K_2O$ or $Na_2O$ was acquired at 1 μm intervals with an acceleration voltage of 15 kV, a probe current of 30 nA, and an integration time of 1000 msec./point. The obtained $K_2O$ concentration profile or $Na_2O$ concentration profile was calculated by proportionally converting a count of a full sheet thickness to mol %, with an average count of a central portion in the sheet thickness (0.5×t)±25 μm (assuming the sheet thickness as t μm) as a bulk composition.

For Examples 1 to 40, which are working examples, the molar ratio of K ions at a depth of 3 μm from the surface layer of the glass to Na ions at a depth of 50 μm from the surface layer was within a range of 0.4 or less. FIG. 6 shows the $K_2O$ distribution and the $Na_2O$ distribution from the glass surface layer to a depth of 60 μm analyzed by EPMA. Table 8 shows detailed chemical strengthening conditions for the samples shown in FIG. 6.

Charge Amount

For the charge amount, an amount of change in the charge amount was determined using a static honest meter (H-0110-S4 manufactured by Shishi do Electrostatic, Ltd.), while changing the glass material and chemical strengthening conditions. The measurement was carried out in an environment where the temperature was kept at 22° C. to 25° C. and the humidity was kept at 47% to 55%. Before the measurement, an ionizer was used to destaticize the glass sample for 20 seconds. As for the measurement conditions, the applied voltage was set to 10 kV, ions generated by corona discharge were irradiated for 30 seconds to be charged, and decay of the charge amount was measured for 60 seconds immediately after the irradiation was stopped, and the amount of change in the charge amount was measured for a total of 90 seconds.

Table 9 shows results of chemically strengthening the glass material A and the glass material B and measuring the charge amount thereof with an honest meter. In Table 9, each notation represents the following.

Max Voltage (kV): maximum charge amount

Figure 7:
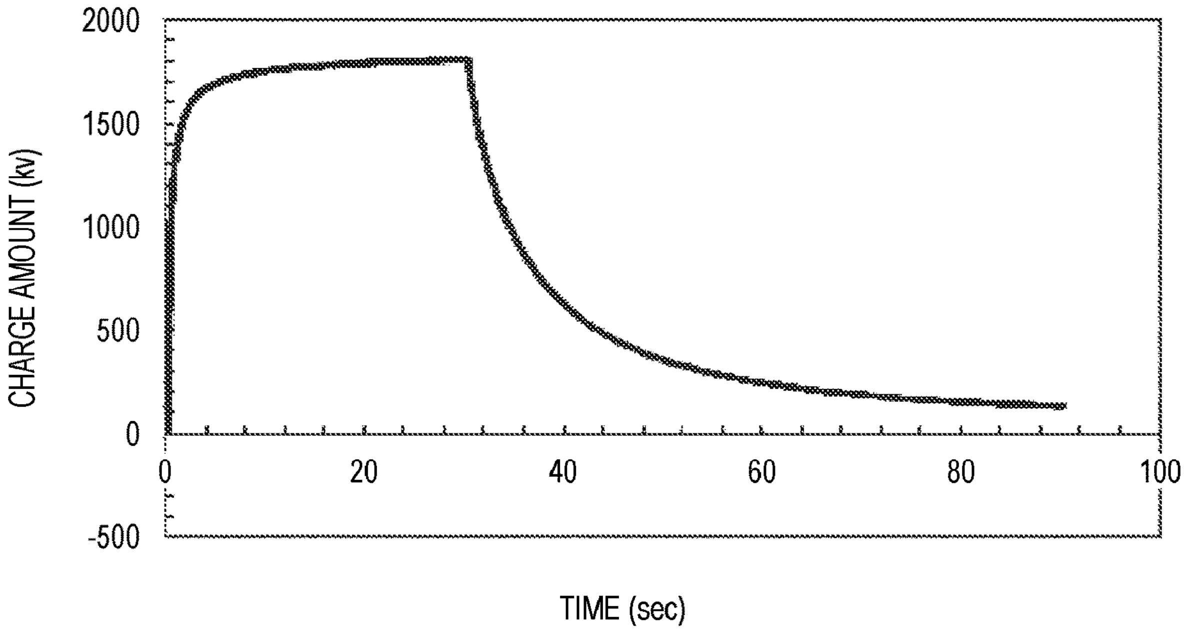
FIG. 7 is a diagram showing results of evaluating an amount of change in a charge amount before and after chemical strengthening for a chemically strengthened glass obtained in Example 1-1.

Voltage after 90 sec (kV): charge amount after 90 seconds from start of measurement Discharge (kV): discharge amount, which is a difference between charge amount after 90 seconds from start of measurement and maximum charge amount $CS_0$ (MPa): compressive stress in glass surface K-DOL (μm): depth value from glass surface of compressive stress layer caused by K ions K-CSarea (MPa·μm): integrated value of $CS_0$ and K-DOL As a result of measuring the glass of Example 1-1 with an honest meter, FIG. 7 shows a change over time of the charge amount [kV].

Figure 8A:
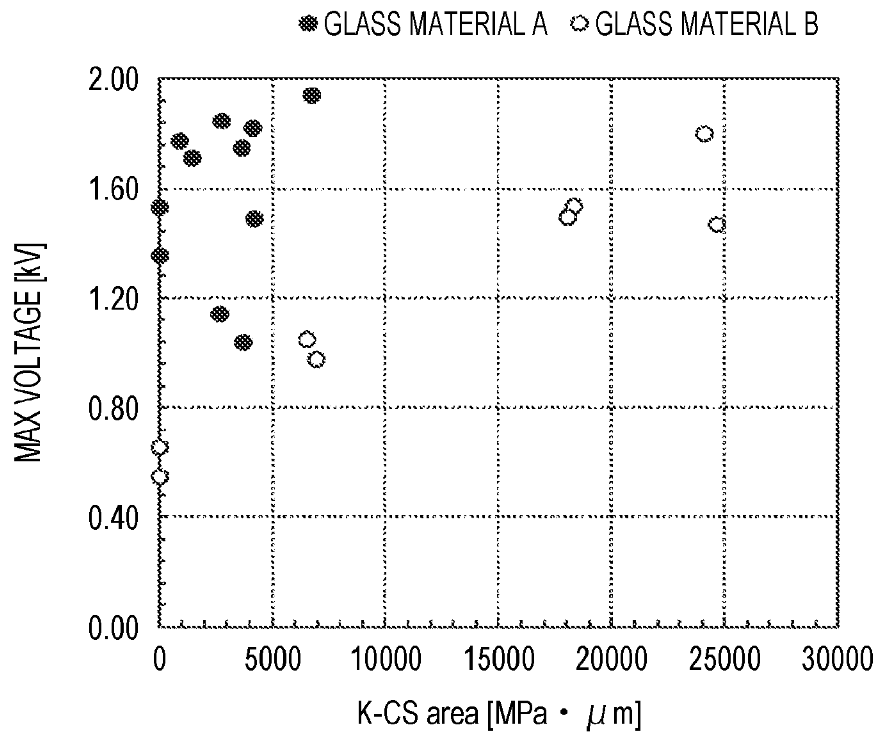
FIGS. 8A and 8B are diagrams showing changes over time in a charge amount of glass under strengthening conditions with different surface layer stress states for glass materials A and B.

FIG. 8A is a diagram showing a relation between the max voltage (kV) and K-CSarea (MPa·μm) regarding the chemically strengthened glass listed in Table 9. As shown in FIG. 8A, there is a positive correlation between the max voltage (kV) and K-CSarea (MPa·μm). From the viewpoint of reducing the charge amount, the value of K-CSarea (MPa·μm) is preferably 10,000 or less.

Figure 8B:
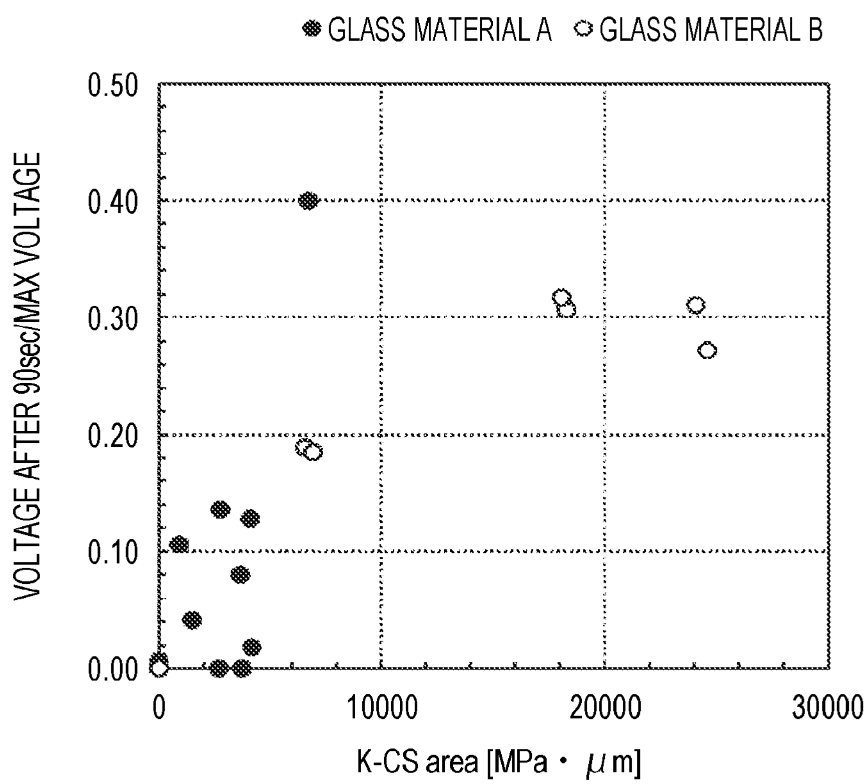

FIG. 8B is a diagram showing a relation between a value obtained by dividing Voltage after 90 sec (kV) by Max Voltage (kV) and K-CSarea (MPa·μm) regarding the chemically strengthened glass listed in Table 9. As shown in FIG. 8B, the smaller the value of Voltage after 90 sec/Max Voltage, the easier it is for the electrified charge to escape, which improves durability of AFP. From the viewpoint of AFP durability, the value of Voltage after 90 sec/Max Voltage is preferably 0.20 or less.

Measurement of Resistivity

The surface resistivity of the chemically strengthened glass of each example in Table 1 was measured by the following method.

Preparation of Glass Sample and Film Formation Step

A glass sample with a size of 120 mm×60 mm×0.7 mm was used as the glass sample. Film formation was carried out according to the following procedure before measuring the surface resistivity. A film was formed on the glass sample with a size of 120 mm×60 mm×0.7 mm using a sputtering device. A platinum target was used as a film formation target to form a film of platinum of 30 nm on the glass surface. During the film formation, patterning based on JIS R3256: 1998 was carried out.

Surface Resistivity

The surface resistivity was measured by the following method.

An ultra-micro ammeter was used as a measuring device.

The surface resistivity was measured by a three-probe method according to JIS C2141:1992 and JIS R3256:1998.

An applied voltage was 100 V, and a value was measured 180 seconds after the voltage was applied. The discharge time was set to 3 seconds.

TABLE 2

| | | | No. | | | | | | | | | |
|---|---|---|---|---|---|---|---|---|---|---|---|---|
| | | | 1 | 2 | 3 | 4 | 5 | 6 | 7 | 8 | 9 | 10 |
| Glass material | | | A | A | A | A | A | A | A | A | A | A |
| Sheet thickness t | | mm | 0.7 | 0.7 | 0.7 | 0.7 | 0.7 | 0.7 | 0.7 | 0.7 | 0.7 | 0.7 |
| CTA | | | 66 | 66 | 66 | 66 | 66 | 66 | 66 | 66 | 66 | 66 |
| K1c | | | 0.8 | 0.8 | 0.8 | 0.8 | 0.8 | 0.8 | 0.8 | 0.8 | 0.8 | 0.8 |
| First ion exchange | Molten salt composition | Mass % | $KNO_3$ 60 + $NaNO_3$ 40 | $KNO_3$ 60 + $NaNO_3$ 40 | $KNO_3$ 60 + $NaNO_3$ 40 | $KNO_3$ 60 + $NaNO_3$ 40 | $KNO_3$ 60 + $NaNO_3$ 40 | $KNO_3$ 60 + $NaNO_3$ 40 | $KNO_3$ 60 + $NaNO_3$ 40 | $KNO_3$ 60 + $NaNO_3$ 40 | $KNO_3$ 60 + $NaNO_3$ 40 | $KNO_3$ 60 + $NaNO_3$ 40 |
| | Contact temperature | ° C. | 420 | 420 | 420 | 420 | 420 | 420 | 420 | 420 | 420 | 420 |
| | Contact time (min) | | 130 | 130 | 130 | 130 | 130 | 130 | 130 | 130 | 130 | 130 |
| Second ion exchange | Molten salt composition | Mass % | $KNO_3$ 100 | $KNO_3$ 100 | $KNO_3$ 100 | $KNO_3$ 99 + $NaNO_3$ 1 | $KNO_3$ 99 + $NaNO_3$ 1 | $KNO_3$ 99 + $NaNO_3$ 1 | $KNO_3$ 99 + $LiNO_3$ 1 | $KNO_3$ 99 + $LiNO_3$ 1 | $KNO_3$ 99 + $LiNO_3$ 1 | $KNO_3$ 99.7 + $LiNO_3$ 0.3 |
| | Contact temperature | ° C. | 420 | 420 | 420 | 420 | 420 | 420 | 420 | 420 | 420 | 420 |
| | Contact time (min) | | 5 | 15 | 30 | 5 | 15 | 30 | 5 | 15 | 30 | 5 |
| $CS_0$ | | MPa | 1127 | 1085 | 1044 | 1086 | 1046 | 1008 | 699 | 663 | 629 | 902 |
| $CS_1$ | | MPa | 280 | 627 | 721 | −179 | 599 | 693 | 294 | 371 | 428 | 292 |
| K-DOL | | μm | 0.9 | 2.4 | 3.2 | 0.9 | 2.3 | 3.2 | 0.8 | 2.3 | 3.1 | 0.9 |
| $CS_{50}$ | | MPa | 137 | 143 | 141 | 135 | 141 | 144 | 144 | 149 | 135 | 140 |
| $CS_{90}$ | | MPa | 9 | 17 | 28 | 6 | 12 | 22 | 16 | 28 | 42 | 11 |
| DOL-zero | | μm | 96 | 98 | 104 | 94 | 96 | 102 | 98 | 104 | 114 | 96 |
| CTave | | MPa | 66.4 | 64.9 | 63.4 | 68 | 69 | 69 | 60 | 55 | 50 | 64 |
| $CS_{50}$/K-DOL | | MPa/μm | 154 | 60 | 44 | 157 | 60 | 45 | 184 | 66 | 43 | 163 |
| $CS_{90}$/K-DOL | | MPa/μm | 10 | 7 | 9 | 7 | 5 | 7 | 20 | 12 | 13 | 13 |
| $CS_{50}$/(K-DOL × t) | | MPa/(μm · mm) | 220 | 86 | 62 | 224 | 86 | 64 | 263 | 94 | 61 | 233 |
| $CS_{90}$/(K-DOL × t) | | MPa/(μm · mm) | 14 | 10 | 12 | 10 | 8 | 10 | 29 | 18 | 19 | 19 |
| $CS_0$/K-DOL | | MPa/μm | 1268 | 458 | 323 | 1265 | 447 | 315 | 890 | 292 | 201 | 1052 |
| $CS_0$ × K-DOL | | MPa · μm | 1001 | 2573 | 3374 | 932 | 2449 | 3224 | 549 | 1504 | 1966 | 774 |
| Mock set drop test average drop height against #180 sandpaper | | cm | — | 83 | — | — | 80 | — | — | 90 | — | — |

TABLE 3

| | | | No. | | | | | | | | | |
|---|---|---|---|---|---|---|---|---|---|---|---|---|
| | | | 11 | 12 | 13 | 14 | 15 | 16 | 17 | 18 | 19 | 20 |
| Glass material | | | A | A | A | A | A | A | A | A | A | A |
| Sheet thickness t | | mm | 0.7 | 0.7 | 0.7 | 0.7 | 0.7 | 0.7 | 0.7 | 0.7 | 0.7 | 0.7 |
| CTA | | | 66 | 66 | 66 | 66 | 66 | 66 | 66 | 66 | 66 | 66 |
| K1c | | | 0.8 | 0.8 | 0.8 | 0.8 | 0.8 | 0.8 | 0.8 | 0.8 | 0.8 | 0.8 |
| First ion exchange | Molten salt composition | Mass % | $KNO_3$ 60 + $NaNO_3$ 40 | $KNO_3$ 60 + $NaNO_3$ 40 | $KNO_3$ 60 + $NaNO_3$ 40 | $KNO_3$ 60 + $NaNO_3$ 40 | $KNO_3$ 60 + $NaNO_3$ 40 | $KNO_3$ 60 + $NaNO_3$ 40 | $KNO_3$ 60 + $NaNO_3$ 40 | $KNO_3$ 60 + $NaNO_3$ 40 | $KNO_3$ 60 + $NaNO_3$ 40 | $KNO_3$ 60 + $NaNO_3$ 40 |
| | Contact temperature | ° C. | 420 | 420 | 420 | 420 | 420 | 420 | 420 | 430 | 430 | 430 |
| | Contact time (min) | | 130 | 130 | 130 | 130 | 130 | 130 | 130 | 60 | 90 | 120 |
| Second ion exchange | Molten salt composition | Mass % | $KNO_3$ 99.7 + $LiNO_3$ 0.3 | $KNO_3$ 99.7 + $LiNO_3$ 0.3 | $KNO_3$ 99.7 + $LiNO_3$ 0.3 | $KNO_3$ 99.7 + $LiNO_3$ 0.3 | $KNO_3$ 99.7 + $LiNO_3$ 0.3 | $KNO_3$ 99.7 + $LiNO_3$ 0.3 | $KNO_3$ 99.7 + $LiNO_3$ 0.3 | $KNO_3$ 99.7 + $LiNO_3$ 0.3 | $KNO_3$ 99.7 + $LiNO_3$ 0.3 | $KNO_3$ 99.7 + $LiNO_3$ 0.3 |
| | Contact temperature | ° C. | 420 | 420 | 400 | 400 | 390 | 380 | 380 | 420 | 420 | 420 |
| | Contact time (min) | | 15 | 30 | 10 | 30 | 30 | 30 | 60 | 15 | 15 | 15 |
| $CS_0$ | | MPa | 864 | 826 | 792 | 744 | 710 | 875 | 831 | 882 | 872 | 863 |
| $CS_1$ | | MPa | 495 | 568 | 195 | 470 | 488 | 482 | 550 | 513 | 504 | 495 |
| K-DOL | | μm | 2.3 | 3.2 | 1.3 | 2.7 | 3.2 | 2.2 | 3.0 | 2.4 | 2.4 | 2.3 |
| $CS_{50}$ | | MPa | 145 | 139 | 144 | 143 | 138 | 145 | 135 | 102 | 129 | 146 |
| $CS_{90}$ | | MPa | 21 | 32 | 17 | 30 | 36 | 24 | 37 | −12 | 6 | 22 |
| DOL-zero | | μm | 100 | 108 | 100 | 106 | 110 | 102 | 110 | 84 | 94 | 102 |
| CTave | | MPa | 62 | 59 | 64 | 61 | 59 | 60 | 62 | 48 | 56 | 62 |
| $CS_{50}$/K-DOL | | MPa/μm | 62 | 44 | 109 | 52 | 43 | 65 | 46 | 43 | 54 | 62 |

TABLE 3-continued

| Glass material | | No. 11 A | 12 A | 13 A | 14 A | 15 A | 16 A | 17 A | 18 A | 19 A | 20 A |
|---|---|---|---|---|---|---|---|---|---|---|---|
| $CS_{90}$/K-DOL | MPa/μm | 9 | 10 | 13 | 11 | 11 | 11 | 13 | −5 | 2 | 9 |
| $CS_{50}$/(K-DOL × t) | MPa/(μm · mm) | 89 | 62 | 156 | 75 | 62 | 93 | 65 | 61 | 78 | 89 |
| $CS_{90}$/(K-DOL × t) | MPa/(μm · mm) | 13 | 14 | 19 | 16 | 16 | 15 | 18 | −7 | 4 | 13 |
| $CS_0$/K-DOL | MPa/μm | 369 | 258 | 598 | 273 | 222 | 393 | 281 | 369 | 368 | 368 |
| $CS_0$ × K-DOL | MPa · μm | 2021 | 2643 | 1050 | 2023 | 2270 | 1949 | 2457 | 2110 | 2064 | 2025 |
| Mock set drop test average drop height against #180 sandpaper | cm | 88 | — | — | | — | — | — | — | — | |

TABLE 4

| Glass material | | | No. 21 A | 22 A | 23 A | 24 A | 25 A | 26 A | 27 A | 28 A | 29 A | 30 A |
|---|---|---|---|---|---|---|---|---|---|---|---|---|
| Sheet thickness t | | mm | 0.7 | 0.7 | 0.7 | 0.7 | 0.7 | 0.7 | 0.7 | 0.7 | 0.7 | 0.7 |
| CTA | | | 66 | 66 | 66 | 66 | 66 | 66 | 66 | 66 | 66 | 66 |
| K1c | | | 0.8 | 0.8 | 0.8 | 0.8 | 0.8 | 0.8 | 0.8 | 0.8 | 0.8 | 0.8 |
| First ion exchange | Molten salt composition | Mass % | $KNO_3$ 60 + $NaNO_3$ 40 | $KNO_3$ 60 + $NaNO_3$ 40 | $KNO_3$ 60 + $NaNO_3$ 40 | $KNO_3$ 60 + $NaNO_3$ 40 | $KNO_3$ 60 + $NaNO_3$ 40 | $KNO_3$ 40 + $NaNO_3$ 60 | $KNO_3$ 40 + $NaNO_3$ 60 | $KNO_3$ 40 + $NaNO_3$ 60 | $KNO_3$ 80 + $NaNO_3$ 20 | $KNO_3$ 80 + $NaNO_3$ 20 |
| | Contact temperature | ° C. | 440 | 440 | 440 | 450 | 450 | 420 | 420 | 420 | 420 | 420 |
| | Contact time (min) | | 60 | 90 | 120 | 60 | 90 | 60 | 90 | 120 | 90 | 120 |
| Second ion exchange | Molten salt composition | Mass % | $KNO_3$ 99.7 + $LiNO_3$ 0.3 | $KNO_3$ 99.7 + $LiNO_3$ 0.3 | $KNO_3$ 99.7 + $LiNO_3$ 0.3 | $KNO_3$ 99.7 + $LiNO_3$ 0.3 | $KNO_3$ 99.7 + $LiNO_3$ 0.3 | $KNO_3$ 99.7 + $LiNO_3$ 0.3 | $KNO_3$ 99.7 + $LiNO_3$ 0.3 | $KNO_3$ 99.7 + $LiNO_3$ 0.3 | $KNO_3$ 99.7 + $LiNO_3$ 0.3 | $KNO_3$ 99.7 + $LiNO_3$ 0.3 |
| | Contact temperature | ° C. | 420 | 420 | 420 | 420 | 420 | 420 | 420 | 420 | 420 | 420 |
| | Contact time (min) | | 15 | 15 | 15 | 15 | 15 | 15 | 15 | 15 | 15 | 15 |
| $CS_0$ | | MPa | 880 | 869 | 860 | 878 | 866 | 899 | 889 | 880 | 839 | 832 |
| $CS_1$ | | MPa | 512 | 502 | 493 | 511 | 500 | 512 | 502 | 494 | 495 | 487 |
| K-DOL | | μm | 2.4 | 2.4 | 2.3 | 2.4 | 2.4 | 2.3 | 2.3 | 2.3 | 2.4 | 2.4 |
| $CS_{50}$ | | MPa | 108 | 134 | 151 | 114 | 140 | 101 | 130 | 149 | 105 | 121 |
| $CS_{90}$ | | MPa | −9 | 11 | 28 | −5 | 16 | −16 | 2 | 18 | 0 | 14 |
| DOL-zero | | μm | 86 | 96 | 104 | 88 | 98 | 82 | 92 | 100 | 92 | 98 |
| CTave | | MPa | 50 | 58 | 64 | 51 | 60 | 49 | 57 | 63 | 47 | 53 |
| $CS_{50}$/K-DOL | | MPa/μm | 45 | 57 | 65 | 48 | 59 | 43 | 56 | 65 | 43 | 50 |
| $CS_{90}$/K-DOL | | MPa/μm | −4 | 5 | 12 | −2 | 7 | −7 | 1 | 8 | 0 | 6 |
| $CS_{50}$/(K-DOL × t) | | MPa/(μm · mm) | 64 | 81 | 92 | 68 | 84 | 62 | 81 | 93 | 62 | 72 |
| $CS_{90}$/(K-DOL × t) | | MPa/(μm · mm) | −5 | 6 | 17 | −3 | 9 | −10 | 1 | 11 | 0 | 8 |
| $CS_0$/K-DOL | | MPa/μm | 368 | 367 | 366 | 367 | 366 | 387 | 386 | 386 | 345 | 345 |
| $CS_0$ × K-DOL | | MPa · μm | 2105 | 2058 | 2017 | 2099 | 2051 | 2090 | 2045 | 2006 | 2043 | 2008 |
| Mock set drop test average drop height against #180 sandpaper | | cm | — | — | | — | — | — | — | — | | |

TABLE 5

| Glass material | | | No. 31 A | 32 A | 33 A | 34 A | 35 A | 36 A | 37 A | 38 A | 39 A | 40 A |
|---|---|---|---|---|---|---|---|---|---|---|---|---|
| Sheet thickness t | | mm | 0.7 | 0.7 | 0.6 | 0.6 | 0.6 | 0.6 | 0.5 | 0,5 | 0.5 | 0.5 |
| CTA | | | 66 | 66 | 68 | 68 | 68 | 68 | 76 | 76 | 76 | 76 |
| K1c | | | 0.8 | 0.8 | 0.8 | 0.8 | 0.8 | 0.8 | 0.8 | 0.8 | 0.8 | 0.8 |
| First ion exchange | Molten salt composition | Mass % | $KNO_3$ 40 + $NaNO_3$ 60 | $KNO_3$ 40 + $NaNO_3$ 60 | $KNO_3$ 60 + $NaNO_3$ 40 | $KNO_3$ 60 + $NaNO_3$ 40 | $KNO_3$ 60 + $NaNO_3$ 40 | $KNO_3$ 60 + $NaNO_3$ 40 | $KNO_3$ 60 + $NaNO_3$ 40 | $KNO_3$ 60 + $NaNO_3$ 40 | $KNO_3$ 60 + $NaNO_3$ 40 | $KNO_3$ 60 + $NaNO_3$ 40 |
| | Contact temperature | ° C. | 420 | 420 | 420 | 420 | 420 | 420 | 420 | 420 | 420 | 420 |
| | Contact time (min) | | 120 | 120 | 120 | 120 | 120 | 120 | 100 | 100 | 100 | 100 |
| Second ion exchange | Molten salt composition | Mass % | $KNO_3$ 99 + $LiNO_3$ 0.3 | $KNO_3$ 99 + $LiNO_3$ 0.3 | $KNO_3$ 99.7 + $LiNO_3$ 0.3 | $KNO_3$ 99.7 + $LiNO_3$ 0.3 | $KNO_3$ 99 + $LiNO_3$ 1 | $KNO_3$ 99 + $LiNO_3$ 1 | $KNO_3$ 99.7 + $LiNO_3$ 0.3 | $KNO_3$ 99.7 + $LiNO_3$ 0.3 | $KNO_3$ 99 + $LiNO_3$ 1 | $KNO_3$ 99 + $LiNO_3$ 1 |

TABLE 5-continued

| Glass material | | No. 31 A | 32 A | 33 A | 34 A | 35 A | 36 A | 37 A | 38 A | 39 A | 40 A |
|---|---|---|---|---|---|---|---|---|---|---|---|
| Contact temperature | ° C. | 420 | 420 | 420 | 420 | 420 | 420 | 420 | 420 | 420 | 420 |
| Contact time (min) | | 15 | 30 | 15 | 30 | 15 | 30 | 15 | 30 | 15 | 30 |
| $CS_0$ | MPa | 912 | 873 | 787 | 750 | 726 | 690 | 804 | 762 | 725 | 688 |
| $CS_1$ | MPa | 515 | 600 | 452 | 516 | 407 | 470 | 553 | 427 | 418 | 474 |
| K-DOL | μm | 2.3 | 3.2 | 2.3 | 3.2 | 2.3 | 3.1 | 3.2 | 2.3 | 2.4 | 3.2 |
| $CS_{50}$ | MPa | 143 | 141 | 130 | 123 | 131 | 116 | 108 | 117 | 106 | 101 |
| $CS_{90}$ | MPa | 17 | 28 | 9 | 21 | 17 | 31 | 6 | 3 | −14 | −1 |
| DOL-zero | μm | 100 | 104 | 96 | 102 | 100 | 108 | 94 | 92 | 84 | 90 |
| CTave | MPa | 65 | 63 | 67 | 64 | 60 | 54 | 71 | 68 | 71 | 67 |
| $CS_{50}$/K-DOL | MPa/μm | 62 | 44 | 55 | 38 | 58 | 37 | 34 | 52 | 45 | 31 |
| $CS_{90}$/K-DOL | MPa/μm | 7 | 9 | 4 | 7 | 8 | 10 | 2 | 1 | −6 | 0 |
| $CS_{50}$/(K-DOL × t) | MPa/(μm · mm) | 89 | 63 | 92 | 64 | 96 | 62 | 67 | 103 | 90 | 63 |
| $CS_{90}$/(K-DOL × t) | MPa/(μm · mm) | 11 | 13 | 7 | 11 | 13 | 17 | 4 | 3 | −12 | −1 |
| $CS_0$/K-DOL | MPa/μm | 397 | 273 | 335 | 234 | 319 | 220 | 251 | 335 | 307 | 214 |
| $CS_0$ × K-DOL | MPa · μm | 2098 | 2794 | 1847 | 2404 | 1651 | 2162 | 2578 | 1733 | 1711 | 2215 |
| Mock set drop test average drop height against #180 sandpaper | cm | — | — | 79 | — | — | 70 | — | — | — | — |

TABLE 6

| Glass material | | | No. 41 A | 42 A | 43 A | 44 A | 45 A | 46 A | 47 A | 48 A | 49 A | 50 A |
|---|---|---|---|---|---|---|---|---|---|---|---|---|
| Sheet thickness t | | mm | 0.7 | 0.7 | 0.7 | 0.7 | 0.7 | 0.7 | 0.7 | 0.7 | 0.7 | 0.7 |
| | CTA | | 66 | 66 | 68 | 68 | 68 | 68 | 76 | 76 | 76 | 76 |
| | K1c | | 0.8 | 0.8 | 0.8 | 0.8 | 0.8 | 0.8 | 0.8 | 0.8 | 0.8 | 0.8 |
| First ion exchange | Molten salt composition | Mass % | $KNO_3$ 60 + $NaNO_3$ 40 | $KNO_3$ 60 + $NaNO_3$ 40 | $KNO_3$ 60 + $NaNO_3$ 40 | $KNO_3$ 60 + $NaNO_3$ 40 | $KNO_3$ 60 + $NaNO_3$ 40 | $KNO_3$ 60 + $NaNO_3$ 40 | $KNO_3$ 60 + $NaNO_3$ 40 | $KNO_3$ 60 + $NaNO_3$ 40 | $KNO_3$ 60 + $NaNO_3$ 40 | $KNO_3$ 80 + $NaNO_3$ 20 |
| | Contact temperature | ° C. | 420 | 420 | 420 | 420 | 420 | 420 | 420 | 420 | 450 | 420 |
| | Contact time (min) | | 130 | 130 | 130 | 130 | 130 | 130 | 130 | 130 | 30 | 60 |
| Second ion exchange | Molten salt composition | Mass % | $KNO_3$ 100 | $KNO_3$ 100 | $KNO_3$ 99 + $NaNO_3$ 1 | $KNO_3$ 99 + $NaNO_3$ 1 | $KNO_3$ 99 + $LiNO_3$ 1 | $KNO_3$ 99 + $LiNO_3$ 1 | $KNO_3$ 99.7 + $LiNO_3$ 0.3 | $KNO_3$ 99.7 + $LiNO_3$ 0.3 | $KNO_3$ 99.7 + $LiNO_3$ 0.3 | $KNO_3$ 99.7 + $LiNO_3$ 0.3 |
| | Contact temperature | ° C. | 420 | 420 | 420 | 420 | 420 | 420 | 420 | 420 | 420 | 420 |
| | Contact time (min) | | 60 | 120 | 60 | 120 | 60 | 120 | 60 | 120 | 15 | 15 |
| $CS_0$ | | MPa | 988 | 912 | 954 | 881 | 581 | 516 | 774 | 704 | 892 | 848 |
| $CS_1$ | | MPa | 739 | 706 | 711 | 681 | 430 | 396 | 577 | 544 | 524 | 503 |
| K-DOL | | μm | 4.0 | 4.4 | 3.9 | 4.4 | 3.9 | 4.3 | 3.9 | 4.4 | 2.4 | 2.5 |
| $CS_{50}$ | | MPa | 125 | 90 | 139 | 116 | 96 | 39 | 117 | 76 | 68 | 82 |
| $CS_{90}$ | | MPa | 41 | 45 | 36 | 46 | 54 | 45 | 45 | 45 | −25 | −14 |
| DOL-zero | | μm | 114 | 128 | 110 | 122 | 128 | 144 | 118 | 136 | 74 | 82 |
| CTave | | MPa | 59.8 | 50.9 | 68 | 62 | 42 | 26 | 54 | 44 | 40 | 41 |
| $CS_{50}$/K-DOL | | MPa/μm | 32 | 20 | 35 | 26 | 25 | 9 | 30 | 17 | 28 | 33 |
| $CS_{90}$/K-DOL | | MPa/μm | 10 | 10 | 9 | 10 | 14 | 10 | 12 | 10 | −10 | −6 |
| $CS_{50}$/(K-DOL × t) | | MPa/(μm · mm) | 45 | 29 | 51 | 38 | 36 | 13 | 42 | 25 | 40 | 48 |
| $CS_{90}$/(K-DOL × t) | | MPa/(μm · mm) | 15 | 14 | 13 | 15 | 20 | 15 | 16 | 15 | −15 | −8 |
| $CS_0$/K-DOL | | MPa/μm | 250 | 206 | 243 | 200 | 151 | 119 | 197 | 160 | 368 | 345 |
| $CS_0$ × K-DOL | | MPa · μm | 3912 | 4034 | 3747 | 3872 | 2239 | 2229 | 3041 | 3093 | 2162 | 2084 |
| Mock set drop test average drop height against #180 sandpaper | | cm | — | 62 | — | 75 | — | — | — | 58 | — | — |

TABLE 7

| Glass material | | No. 51 A | 52 A | 53 A | 54 A | 55 A | 56 A | 57 A | 58 A | 59 A | 60 A | 61 A |
|---|---|---|---|---|---|---|---|---|---|---|---|---|
| Sheet thickness t | mm | 0.7 | 0.7 | 0.7 | 0.7 | 0.7 | 0.7 | 0.7 | 0.7 | 0.7 | 0.5 | 0.5 |
| CTA | | 66 | 66 | 66 | 66 | 66 | 66 | 66 | 66 | 66 | 76 | 76 |
| K1c | | 0.8 | 0.8 | 0.8 | 0.8 | 0.8 | 0.8 | 0.8 | 0.8 | 0.8 | 0.8 | 0.8 |
| First ion exchange Molten salt composition | Mass % | $KNO_3$ 60 + $NaNO_3$ 40 | $KNO_3$ 60 + $NaNO_3$ 40 | $KNO_3$ 60 + $NaNO_3$ 40 | $KNO_3$ 60 + $NaNO_3$ 40 | $KNO_3$ 60 + $NaNO_3$ 40 | $KNO_3$ 60 + $NaNO_3$ 40 | $KNO_3$ 80 + $NaNO_3$ 20 | $KNO_3$ 80 + $NaNO_3$ 20 | $KNO_3$ 80 + $NaNO_3$ 20 | $KNO_3$ 60 + $NaNO_3$ 40 | $KNO_3$ 60 + $NaNO_3$ 40 |
| Contact temperature | ° C. | 420 | 420 | 420 | 420 | 420 | 420 | 420 | 420 | 420 | 420 | 420 |
| Contact time (min) | | 120 | 130 | 130 | 130 | 130 | 130 | 270 | 270 | 270 | 100 | 100 |
| Second ion exchange Molten salt composition | Mass % | $KNO_3$ 100 | $KNO_3$ 97 + $NaNO_3$ 3 | $KNO_3$ 97 + $NaNO_3$ 3 | $KNO_3$ 97 + $NaNO_3$ 3 | $KNO_3$ 97 + $NaNO_3$ 3 | $KNO_3$ 97 + $NaNO_3$ 3 | $KNO_3$ 100 | $KNO_3$ 100 | $KNO_3$ 100 | $KNO_3$ 100 | $KNO_3$ 100 |
| Contact temperature | ° C. | 420 | 420 | 420 | 420 | 420 | 420 | 420 | 420 | 420 | 420 | 420 |
| Contact time (min) | | 120 | 5 | 15 | 30 | 60 | 120 | 120 | 180 | 240 | 15 | 30 |
| $CS_0$ | MPa | 883 | 940 | 894 | 850 | 828 | 804 | 1041 | 997 | 962 | 959 | 925 |
| $CS_1$ | MPa | 684 | 283 | 502 | 579 | 614 | 619 | 868 | 859 | 842 | 558 | 640 |
| K-DOL | μm | 4.4 | 0.8 | 2.3 | 3.1 | 3.9 | 4.3 | 6.0 | 7.2 | 8.0 | 2.4 | 3.3 |
| $CS_{50}$ | MPa | 89 | 129 | 136 | 152 | 168 | 166 | 87 | 56 | 30 | 104 | 103 |
| $CS_{90}$ | MPa | 42 | 1 | 3 | 10 | 26 | 48 | 59 | 46 | 33 | −18 | −7 |
| DOL-zero | μm | 126 | 92 | 92 | 96 | 102 | 112 | 146 | 158 | 170 | 84 | 88 |
| CTave | MPa | 50 | 73 | 77 | 80 | 83 | 83 | 56 | 46 | 36 | 78 | 76 |
| $CS_{50}$/K-DOL | MPa/μm | 20 | 162 | 60 | 48 | 43 | 38 | 14 | 8 | 4 | 44 | 30 |
| $CS_{90}$/K-DOL | MPa/μm | 10 | 1 | 1 | 3 | 7 | 11 | 10 | 6 | 4 | −8 | −2 |
| $CS_{50}$/(K-DOL × t) | MPa/(μm · mm) | 29 | 231 | 85 | 69 | 62 | 55 | 21 | 11 | 5 | 87 | 60 |
| $CS_{90}$/(K-DOL × t) | MPa/(μm · mm) | 14 | 2 | 2 | 4 | 10 | 16 | 14 | 9 | 6 | −15 | −4 |
| $CS_0$/K-DOL | MPa/μm | 199 | 1178 | 392 | 271 | 214 | 185 | 174 | 138 | 120 | 401 | 285 |
| $CS_0$ × K-DOL | MPa · μm | 3912 | 750 | 2039 | 2669 | 3203 | 3485 | 6246 | 7178 | 7696 | 2293 | 3007 |
| Mock set drop test average drop height against #180 sandpaper | cm | — | — | — | — | — | — | — | — | — | — | — |

TABLE 8

| | Strengthening condition A | Strengthening condition B |
|---|---|---|
| Glass material | A | A |
| Primary strengthening condition | $NaNO_3$ 100 mass % 410° C. 120 min | $NaNO_3$ 100 mass % 420° C. 90 min |
| Secondary strengthening condition | $KNO_3$ 99 mass % + $NaNO_3$ 1 mass % 440° C. 60 min | $KNO_3$ 99.6 mass % + $NaNO_3$ 0.4 mass % 400° C. 60 min |
| K concentration [mol] at 3 μm depth | 8.7 | 5.2 |

TABLE 8-continued

| | Strengthening condition A | Strengthening condition B |
|---|---|---|
| Na concentration [mol] at 50 μm depth | 16.2 | 18.7 |
| K concentration [mol] at 3 μm depth/ Na concentration [mol] at 50 μm depth | 0.536 | 0.277 |

TABLE 9

| No. | Glass material | Sheet thickness (mm) | First ion exchange Molten salt composition (mass %) | First ion exchange Contact temperature (° C.) | First ion exchange Contact time (min) | Second ion exchange Molten salt composition (mass %) | Second ion exchange Contact temperature (° C.) | Second ion exchange Contact time (min) |
|---|---|---|---|---|---|---|---|---|
| 1-1 | A | 0.7 | $NaNO_3$ 100 | 380 | 120 | $KNO_3$ 100 | 400 | 50 |
| 1-2 | A | 0.7 | $NaNO_3$ 100 | 380 | 120 | $KNO_3$ 95 + $NaNO_3$ 5 | 420 | 10 |
| 1-3 | A | 0.7 | $NaNO_3$ 100 | 380 | 120 | $KNO_3$ 95 + $NaNO_3$ 5 | 420 | 30 |
| 1-4 | A | 0.7 | $NaNO_3$ 100 | 380 | 120 | $KNO_3$ 98 + $NaNO_3$ 2 | 440 | 70 |
| 1-5 | A | 0.7 | $NaNO_3$ 100 | 380 | 120 | $KNO_3$ 98.8 + $NaNO_3$ 1 + $LiNO_3$ 0.2 | 400 | 60 |
| 1-6 | A | 0.7 | $KNO_3$ 60 + $NaNO_3$ 40 | 380 | 80 | $KNO_3$ 99.5 + $LiNO_3$ 0.5 | 380 | 25 |
| 1-7 | A | 0.7 | No chemical strengthening | | | | | |
| 2-1 | A | 0.55 | $NaNO_3$ 100 | 380 | 120 | $KNO_3$ 100 | 400 | 50 |

TABLE 9-continued

| | | | | | | | | |
|---|---|---|---|---|---|---|---|---|
| 2-2 | A | 0.55 | $NaNO_3$ 100 | 380 | 120 | $KNO_3$ 95 + $NaNO_3$ 5 | 420 | 30 |
| 2-3 | A | 0.55 | $NaNO_3$ 100 | 380 | 120 | $KNO_3$ 98.8 + $NaNO_3$ 1 + $LiNO_3$ 0.2 | 400 | 60 |
| 2-4 | A | 0.55 | | | No chemical strengthening | | | |
| 3-1 | B | 0.7 | $KNO_3$ 30 + $NaNO_3$ 70 | 380 | 240 | $KNO_3$ 95 + $NaNO_3$ 5 | 380 | 40 |
| 3-2 | B | 0.7 | $NaNO_3$ 100 | 390 | 180 | $KNO_3$ 100 | 450 | 60 |
| 3-3 | B | 0.7 | $NaNO_3$ 100 | 390 | 180 | $KNO_3$ 100 | 450 | 120 |
| 3-4 | B | 0.7 | | | No chemical strengthening | | | |
| 4-1 | B | 0.55 | $KNO_3$ 30 + $NaNO_3$ 70 | 380 | 240 | $KNO_3$ 95 + $NaNO_3$ 5 | 380 | 40 |
| 4-2 | B | 0.55 | $NaNO_3$ 100 | 390 | 180 | $KNO_3$ 100 | 450 | 60 |
| 4-3 | B | 0.55 | $NaNO_3$ 100 | 390 | 180 | $KNO_3$ 100 | 450 | 120 |
| 4-4 | B | 0.55 | | | No chemical strengthening | | | |

| No. | Max Voltage [kV] | Voltage after 90 sec [kV] | Discharge [kV] | Voltage after 90 sec/Max Voltage | $CS_0$ (MPa) | K-DOL (μm) | K-CS area (MPa · μm) | Max Voltage/ CS area [V/(MPa · μm)] |
|---|---|---|---|---|---|---|---|---|
| 1-1 | 1.82 | 0.13 | 1.69 | 0.07 | 1219 | 3.4 | 4144 | 0.44 |
| 1-2 | 1.78 | 0.11 | 1.67 | 0.06 | 900 | 1.0 | 900 | 1.97 |
| 1-3 | 1.75 | 0.08 | 1.67 | 0.05 | 892 | 4.1 | 3655 | 0.48 |
| 1-4 | 1.94 | 0.40 | 1.64 | 0.21 | 911 | 7.4 | 6739 | 0.29 |
| 1-5 | 1.85 | 0.14 | 1.71 | 0.07 | 926 | 3.0 | 2779 | 0.66 |
| 1-6 | 1.71 | 0.04 | 1.67 | 0.02 | 600 | 2.5 | 1500 | 1.14 |
| 1-7 | 1.53 | 0.00 | 1.53 | 0.00 | 0 | 0.0 | 0 | — |
| 2-1 | 1.49 | 0.02 | 1.47 | 0.01 | 1202 | 3.5 | 4208 | 0.35 |
| 2-2 | 1.04 | 0.00 | 1.04 | 0.00 | 889 | 4.2 | 3733 | 0.28 |
| 2-3 | 1.14 | 0.00 | 1.14 | 0.00 | 878 | 3.1 | 2721 | 0.42 |
| 2-4 | 1.35 | 0.01 | 1.35 | 0.00 | 0 | 0.0 | 0 | — |
| 3-1 | 1.05 | 0.20 | 0.82 | 0.19 | 851 | 7.7 | 6550 | 0.16 |
| 3-2 | 1.54 | 0.47 | 1.06 | 0.31 | 958 | 19.1 | 18304 | 0.08 |
| 3-3 | 1.47 | 0.40 | 1.20 | 0.27 | 905 | 27.2 | 24617 | 0.06 |
| 3-4 | 0.65 | 0.00 | 0.65 | 0.00 | 0 | 0.0 | 0 | — |
| 4-1 | 0.98 | 0.18 | 0.81 | 0.18 | 829 | 8.4 | 6967 | 0.14 |
| 4-2 | 1.49 | 0.47 | 1.02 | 0.32 | 941 | 19.2 | 18066 | 0.08 |
| 4-3 | 1.80 | 0.56 | 1.23 | 0.31 | 889 | 27.1 | 24100 | 0.07 |
| 4-4 | 0.55 | 0.00 | 0.55 | 0.00 | 0 | 0.0 | 0 | — |

FIGS. 3A, 3B, 4, 5A, and 5B are diagrams created by plotting the data shown in Tables 2 to 7. As shown in FIG. 3A, it was found that by containing the first alkali metal ions (lithium ions) in the second molten salt composition used for the second ion exchange, the peak value of $CS_{50}$ can be increased. However, when the second molten salt composition contains the first alkali metal ion (lithium ion), the peak value of $CS_{50}$ becomes lower when the second ion exchange treatment time is excessive. As shown in FIG. 3B, it was found that by containing excess second alkali metal ions (sodium ions) in the second molten salt composition, although the peak value of $CS_{50}$ is increased, CTave may exceed the CT limit.

As shown in FIG. 4, it was found that in order to maximize $CS_{50}$ without exceeding the CT limit, it is effective to design the stress profile according to the peak value of $CS_{50}$ in the second ion exchange treatment.

As shown in FIG. 5A, it was found that the K-DOL value increases as the treatment time of the second ion exchange increases. As shown in FIG. 5B, it was found that a stress profile can be designed for the peak value of $CS_{50}$ in the second ion exchange treatment by setting the K-DOL value to 5 μm or less.

From the above results, it can be seen that by controlling the K-DOL value to 5 μm or less, the diffusion of the second alkali metal ions in the second ion exchange treatment can be optimized, and $CS_{50}$ can be maximized.

As shown in Tables 2 and 3, the chemically strengthened glasses of Examples have a K-DOL value controlled to 5 μm or less, and a maximized $CS_{50}$, so that a high set drop strength that could not be achieved in the related art can be exhibited.

As shown in Table 9 and FIG. 8A, it was found that from the viewpoint of reducing the charge amount, the value of K-CSarea (MPa·μm) is preferably 10,000 or less. As shown in FIG. 8B, it was found that the ratio obtained by dividing a charge amount (kV) when charged for 30 seconds and after 60 seconds from completion of charging by a maximum charge amount (kV) during charging is preferably 0.20 or less.

Although the present invention has been described in detail and by reference to the specific embodiments, it is apparent to one skilled in the art that various modifications or changes can be made without departing the spirit and scope of the present invention.

This application is based on Japanese Patent Application No. 2022-158728 filed on Sep. 30, 2022, and Japanese Patent Application No. 2023-097664 filed on Jun. 14, 2023, contents of which are incorporated herein by reference.

What is claimed is:

1. A chemically strengthened glass having a K-DOL defined as below of 5 μm or less, and having a value $CS_{50}$/(K-DOL×t) obtained by dividing a compressive stress $CS_{50}$ (MPa) at a depth of 50 μm from a surface of the chemically strengthened glass by a product of the K-DOL (μm) and a sheet thickness t (mm) of 45 (MPa/(μm·mm)) or more, K-DOL: depth value (μm) from a glass surface of a compressive stress layer caused by K ions.

2. The chemically strengthened glass according to claim 1, wherein a CTave (MPa) represented by the following Formula (1) is equal to or less than a CTA value (MPa) represented by the following Formula (2), $$CTave=ICT/L_{CT} \quad \text{Formula (1)}$$

[Math. 1]

$$CTA=317.93\times K1c\sqrt{1000t}+228.5\times 1000t-398 \quad \text{Formula (2)}$$

t: sheet thickness (mm)

ICT: integrated value (Pa·m) of tensile stress $L_{CT}$: sheet thickness direction length (μm) of tensile stress area K1c: fracture toughness value ($MPa\cdot m^{1/2}$) of chemically strengthened glass.

3. The chemically strengthened glass according to claim 1, wherein when the sheet thickness is t (mm), the $CS_{50}$ is 206×t−15 (MPa) or more.

4. The chemically strengthened glass according to claim 1, wherein when the sheet thickness is 0.6 mm, a set drop strength measured by a sandpaper set drop strength test under the following condition is 60 cm or more, condition: an electronic device mounted with the chemically strengthened glass, or an electronic device simulated structure in which the chemically strengthened glass and a housing that holds the chemically strengthened glass are integrated, is dropped from a height of 30 cm on a #180 sandpaper; if the chemically strengthened glass is not broken, the drop height is increased by 5 cm and dropping is performed again; as long as the chemically strengthened glass is not broken after being dropped, the step of dropping from a height increased by 5 cm is repeated; a height at which the chemically strengthened glass is broken for the first time is defined as a breaking height; a drop test is performed using 10 samples, and an average breaking height of the 10 samples is defined as the set drop strength.

5. The chemically strengthened glass according to claim 1, wherein when the sheet thickness is 0.5 mm, a set drop strength measured by a sandpaper set drop strength test under the following condition is 50 cm or more, condition: an electronic device mounted with the chemically strengthened glass, or an electronic device simulated structure in which the chemically strengthened glass and a housing that holds the chemically strengthened glass are integrated, is dropped from a height of 30 cm on a #180 sandpaper; if the chemically strengthened glass is not broken, the drop height is increased by 5 cm and dropping is performed again; as long as the chemically strengthened glass is not broken after being dropped, the step of dropping from a height increased by 5 cm is repeated; a height at which the chemically strengthened glass is broken for the first time is defined as a breaking height; a drop test is performed using 10 samples, and an average breaking height of the 10 samples is defined as the set drop strength.

6. The chemically strengthened glass according to claim 1, wherein a value obtained by dividing a compressive stress CS (MPa) by the K-DOL (μm) is 230 (MPa/μm) or more.

7. The chemically strengthened glass according to claim 1, wherein a compressive stress value $CS_0$ at a depth of 0 μm from the surface is 800 MPa or more and 1200 MPa or less.

8. The chemically strengthened glass according to claim 1, wherein a compressive stress value $CS_1$ at a depth of 1 μm from the surface is 450 MPa or more.

9. The chemically strengthened glass according to claim 1, wherein when the sheet thickness is t (mm), a compressive stress layer depth DOC is 150×t+20 (μm) or less.

10. The chemically strengthened glass according to claim 1, wherein the charge amount (kV) when charged for 30 seconds and after 60 seconds from completion of charging is 0.20 (kV) or less, provided that the charge amount is measured by a static honest meter.

* * * * *